(12) United States Patent
Saori

(10) Patent No.: US 9,001,440 B2
(45) Date of Patent: Apr. 7, 2015

(54) MACRO LENS SYSTEM

(71) Applicant: Pentax Ricoh Imaging Company, Ltd., Tokyo (JP)

(72) Inventor: Masakazu Saori, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 2 days.

(21) Appl. No.: 13/853,464

(22) Filed: Mar. 29, 2013

(65) Prior Publication Data

US 2013/0265648 A1 Oct. 10, 2013

(30) Foreign Application Priority Data

Apr. 6, 2012 (JP) ................................. 2012-087206
Dec. 19, 2012 (JP) ................................. 2012-277050

(51) Int. Cl.
*G02B 9/04* (2006.01)
*G02B 15/22* (2006.01)
*G02B 15/177* (2006.01)

(52) U.S. Cl.
CPC *G02B 15/22* (2013.01); *G02B 9/04* (2013.01); *G02B 15/177* (2013.01)

(58) Field of Classification Search
CPC .............. G02B 9/00; G02B 9/04; G02B 9/06; G02B 9/10

USPC ................................... 359/691, 692, 793–795
See application file for complete search history.

(56) References Cited

U.S. PATENT DOCUMENTS 5,835,286 A * 11/1998 Yamanashi ................. 359/755
7,663,816 B2 * 2/2010 Sato ............................ 359/794
2009/0153980 A1 6/2009 Yamamoto

FOREIGN PATENT DOCUMENTS

| JP | 07-152001 | 6/1995 |
| JP | 07-261126 | 10/1995 |
| JP | 09-218349 | 8/1997 |
| JP | 2009-145588 | 7/2009 |

* cited by examiner

*Primary Examiner* — Darryl J Collins
(74) *Attorney, Agent, or Firm* — Greenblum & Bernstein P.L.C.

(57) ABSTRACT

A macro lens system includes a positive first lens group, and a positive or negative second lens group, in that order from the object side, wherein at least the first lens group moves toward the object side when focusing on an object at infinity to an object at a close distance, wherein the second lens group includes a negative first sub-lens group and a positive second sub-lens group, in that order from the object side, wherein the following condition (1) is satisfied:

−5.0<f2A/fi<−0.8        (1), wherein f2A designates the focal length of the first sub-lens group, and fi designates the focal length of the entire the macro lens system when focusing on an object at infinity.

20 Claims, 33 Drawing Sheets

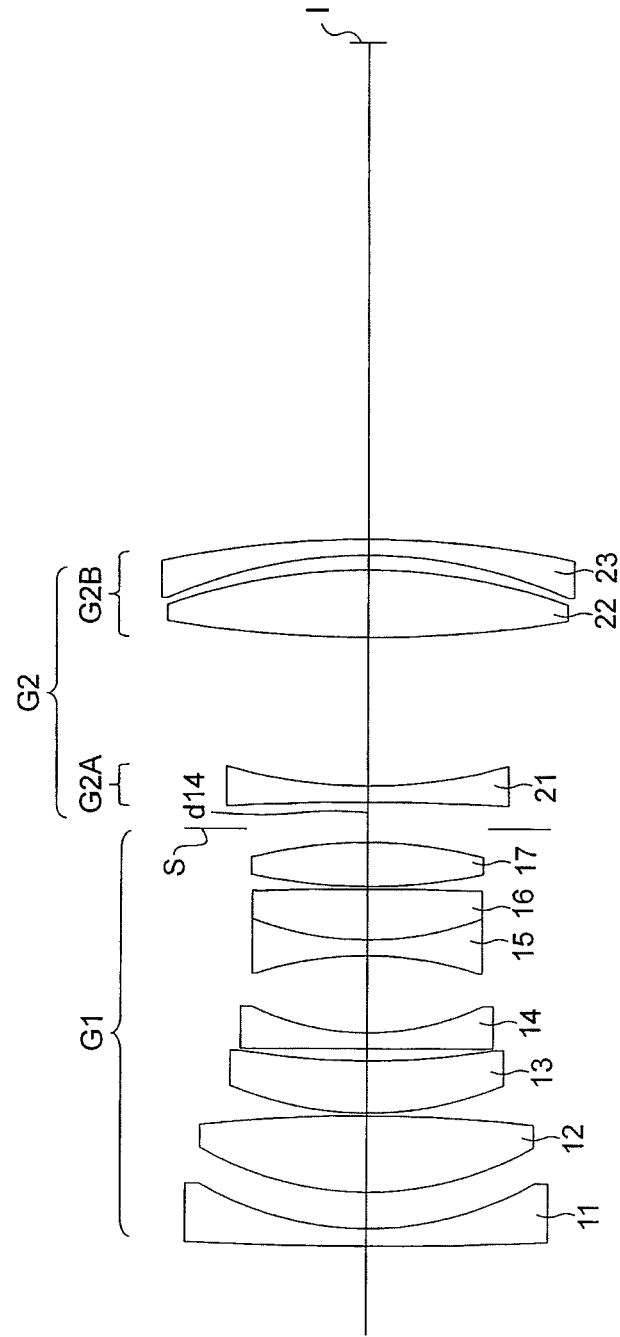

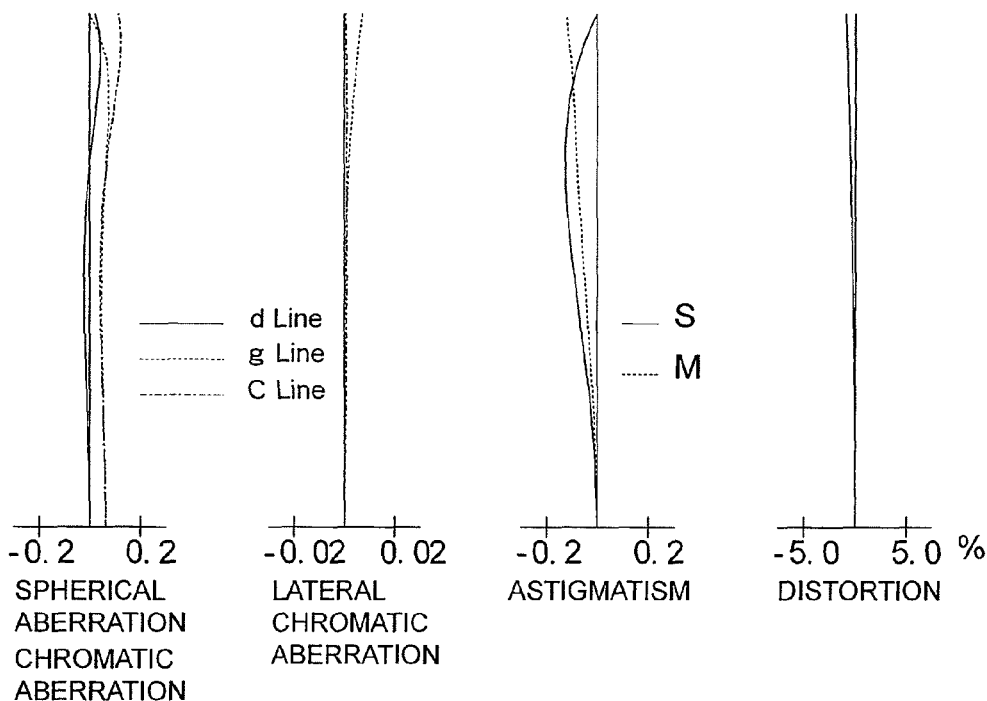

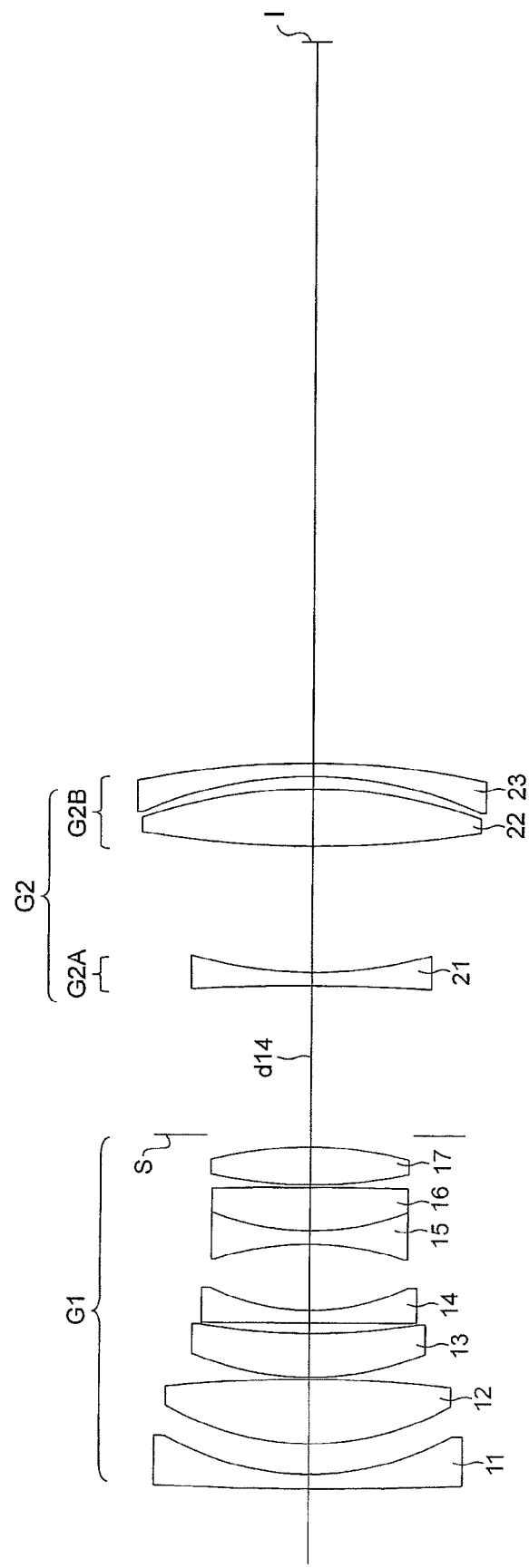

FNO.=1:5.6

-0.2  0.2
SPHERICAL
ABERRATION
CHROMATIC
ABERRATION

— d Line
······ g Line
---- C Line

Y=21.6

-0.02  0.02
LATERAL
CHROMATIC
ABERRATION

Y=21.6

-0.2  0.2
ASTIGMATISM

— S
···· M

Y=21.6

-5.0  5.0 %
DISTORTION

Y= 0.00
+0.20
-0.20

Y= 12.00
+0.20
-0.20

Y= 18.00
+0.20
-0.20

Y= 21.64
+0.20
-0.20

— d Line
······ g Line
---- C Line

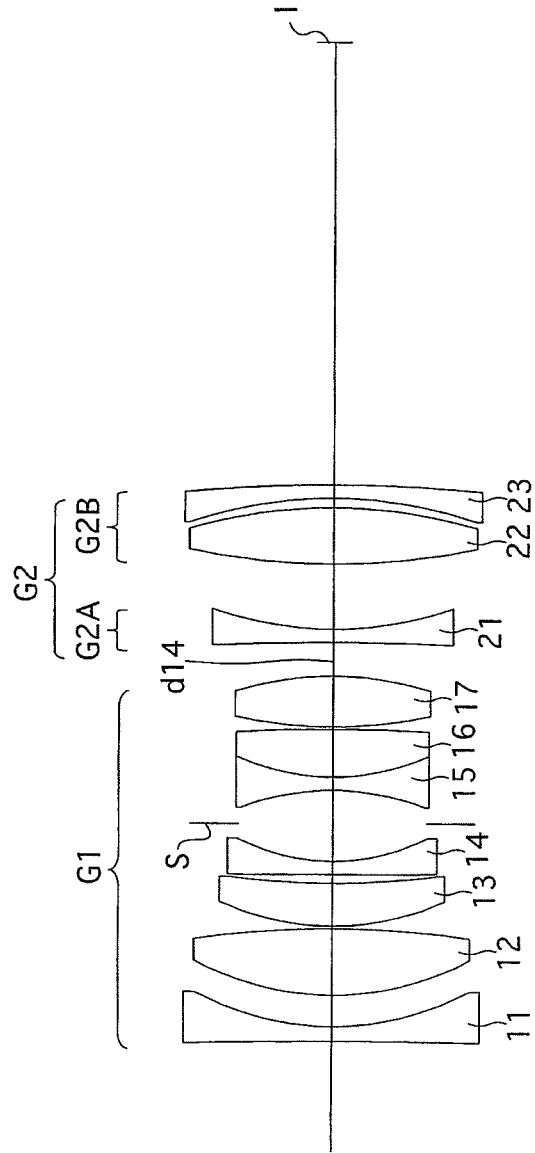

FNO.=1:2.9  Y=21.6  Y=21.6  Y=21.6

-0.2  0.2    -0.02  0.02    -0.2  0.2    -2.0  2.0 %
SPHERICAL     LATERAL      ASTIGMATISM    DISTORTION
ABERRATION    CHROMATIC
CHROMATIC     ABERRATION
ABERRATION

Y= 0.00

Y= 12.00

Y= 18.00

Y= 21.64

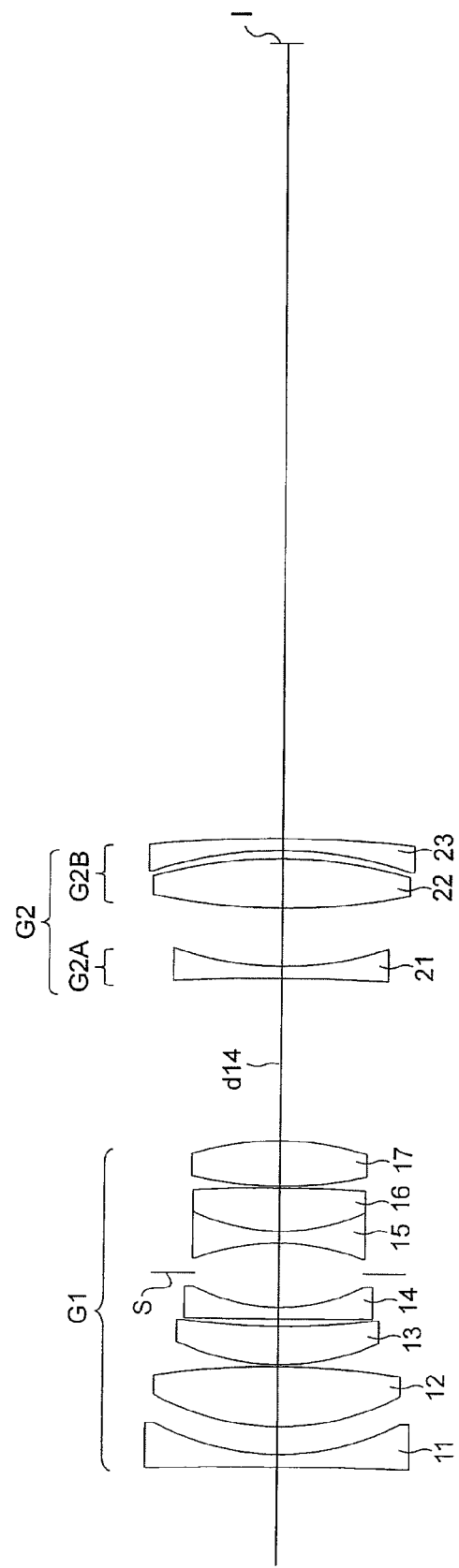

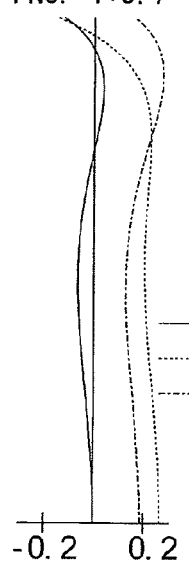
Fig.11A
FNO.=1:5.7
- d Line
- g Line
- C Line
-0.2  0.2
SPHERICAL
ABERRATION
CHROMATIC
ABERRATION
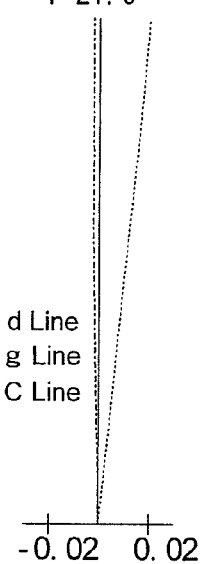
Fig.11B
Y=21.6
-0.02  0.02
LATERAL
CHROMATIC
ABERRATION
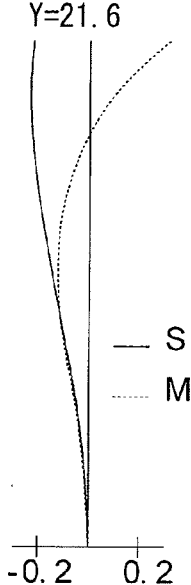
Fig.11C
Y=21.6
— S
---- M
-0.2  0.2
ASTIGMATISM
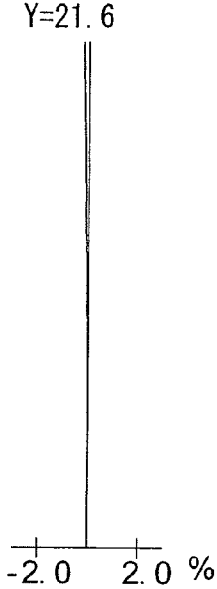
Fig.11D
Y=21.6
-2.0  2.0 %
DISTORTION
Fig.12A
Y= 0.00
+0.10
-0.10
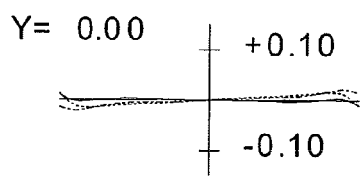
Fig.12B
Y= 12.00
+0.10
-0.10
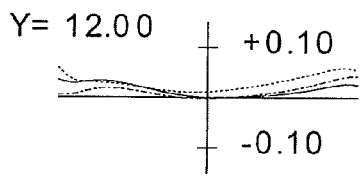
Fig.12C
Y= 18.00
+0.10
-0.10
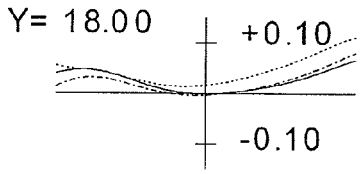
Fig.12D
Y= 21.64
+0.10
-0.10
— d Line
- g Line
---- C Line
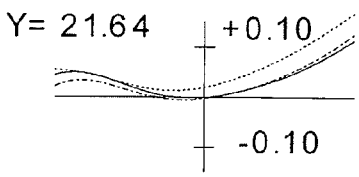

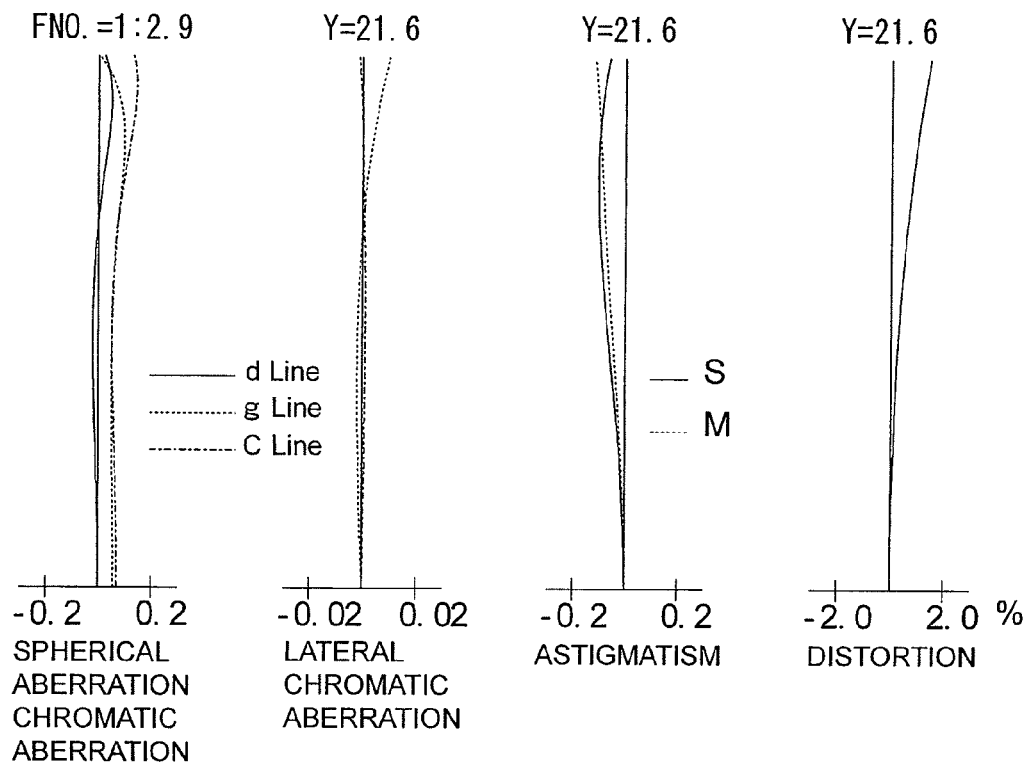

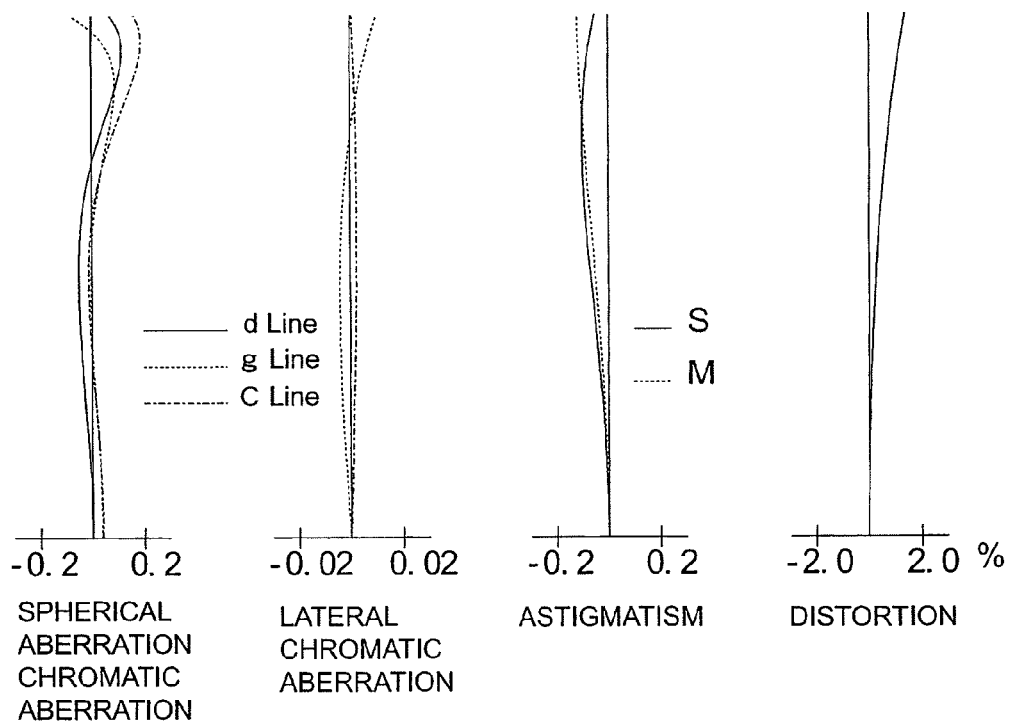
Fig.20A FNO.=1:2.9  Fig.20B Y=21.6  Fig.20C Y=21.6  Fig.20D Y=21.6
SPHERICAL ABERRATION CHROMATIC ABERRATION
LATERAL CHROMATIC ABERRATION
ASTIGMATISM
DISTORTION
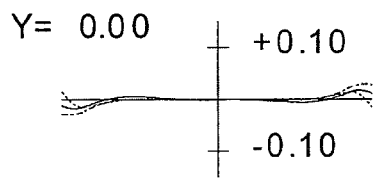
Fig.21A  Y= 0.00
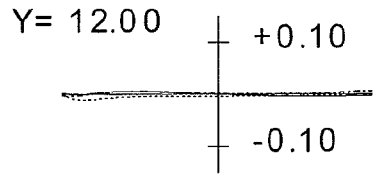
Fig.21B  Y= 12.00
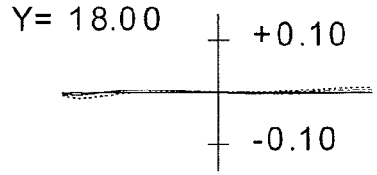
Fig.21C  Y= 18.00
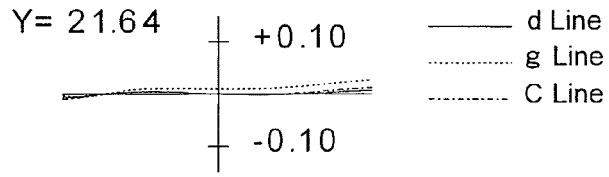
Fig.21D  Y= 21.64

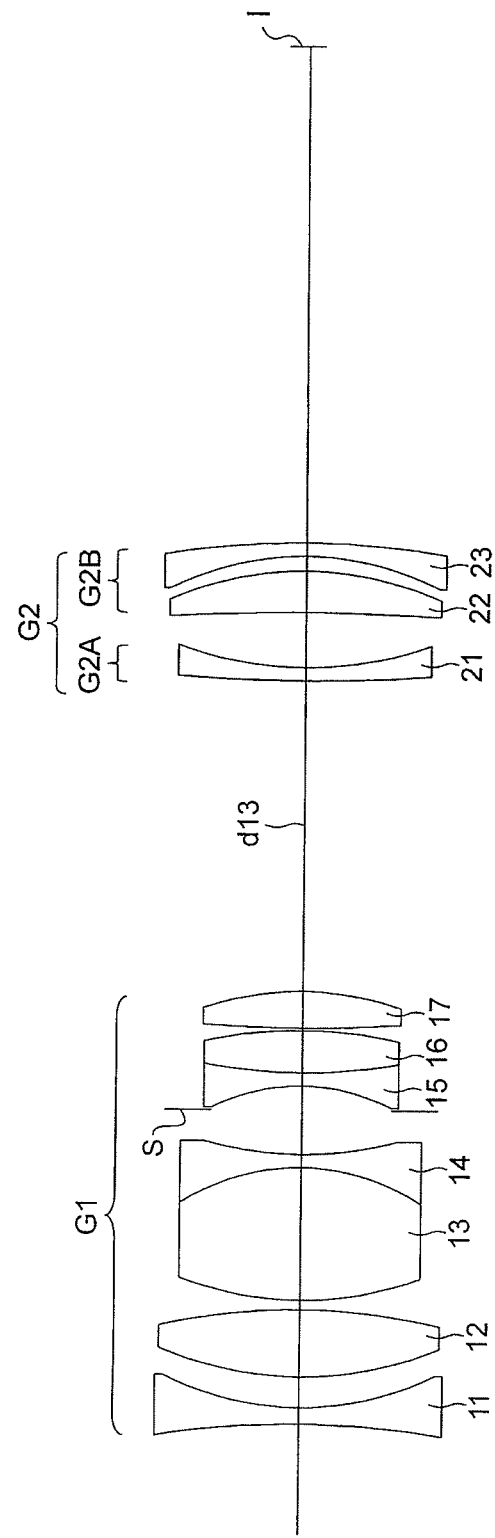

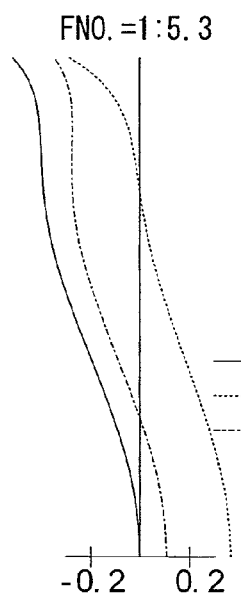
Fig.23A
FNO.=1:5.3
SPHERICAL
ABERRATION
CHROMATIC
ABERRATION
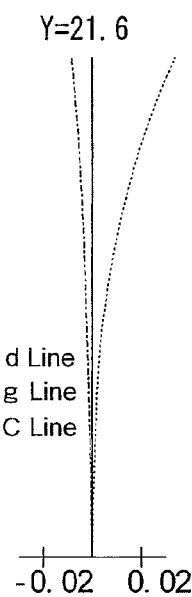
Fig.23B
Y=21.6
LATERAL
CHROMATIC
ABERRATION
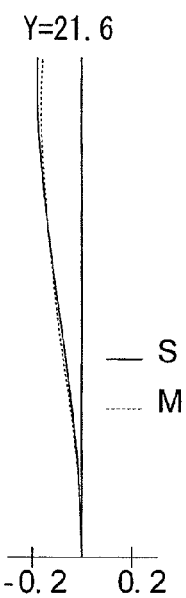
Fig.23C
Y=21.6
ASTIGMATISM
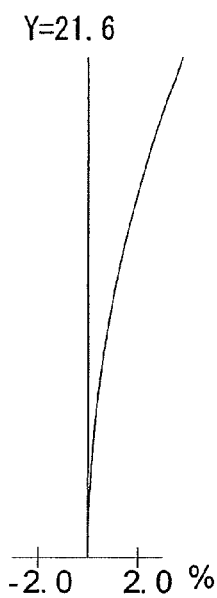
Fig.23D
Y=21.6
DISTORTION
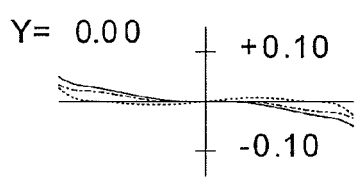
Fig.24A  Y= 0.00
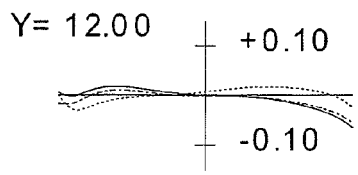
Fig.24B  Y= 12.00
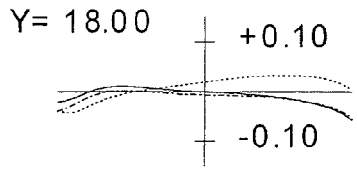
Fig.24C  Y= 18.00
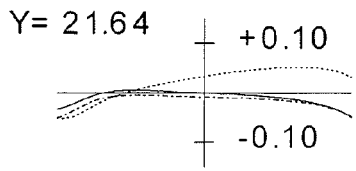
Fig.24D  Y= 21.64

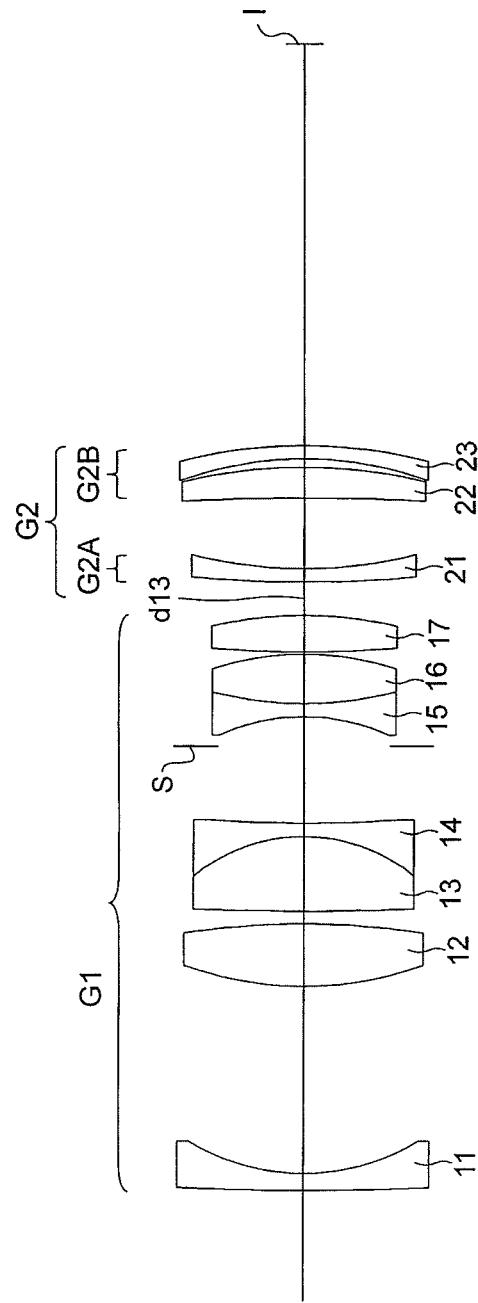

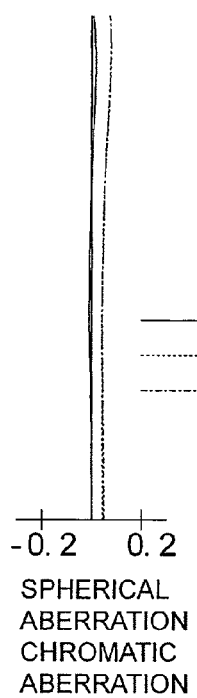
Fig.26A
FNO.=1:2.9
—— d Line
········ g Line
—–— C Line
-0.2  0.2
SPHERICAL
ABERRATION
CHROMATIC
ABERRATION
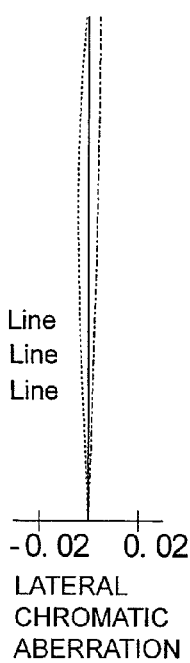
Fig.26B
Y=14.2
-0.02  0.02
LATERAL
CHROMATIC
ABERRATION
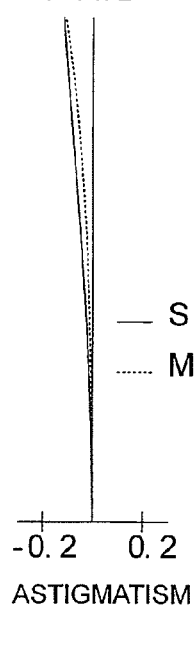
Fig.26C
Y=14.2
—— S
······ M
-0.2  0.2
ASTIGMATISM
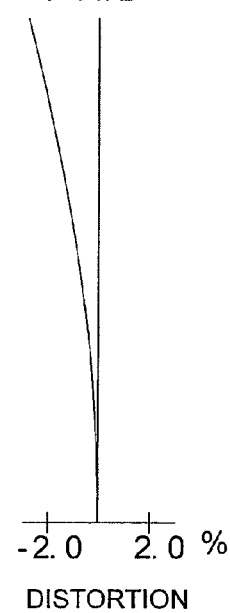
Fig.26D
Y=14.2
-2.0  2.0 %
DISTORTION
Fig.27A  Y= 0.00
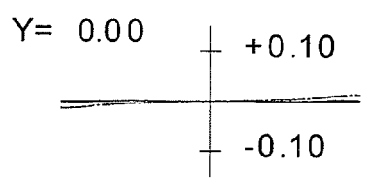
+0.10
-0.10
Fig.27B  Y= 7.90
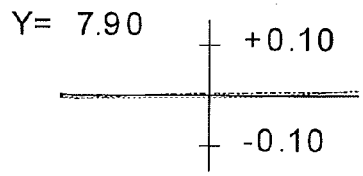
+0.10
-0.10
Fig.27C  Y= 11.85
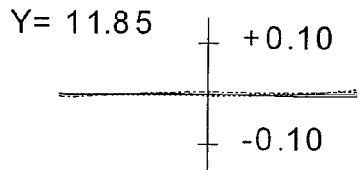
+0.10
-0.10
Fig.27D  Y= 14.24
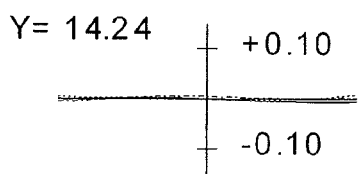
+0.10
-0.10
—— d Line
········ g Line
—–— C Line Fig.29A
FNO.=1:4.9
Fig.29B
Y=14.2
Fig.29C
Y=14.2
Fig.29D
Y=14.2
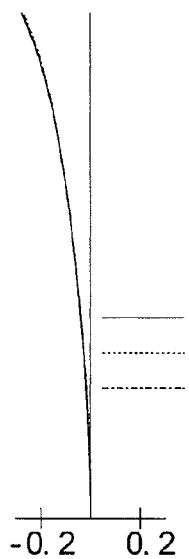
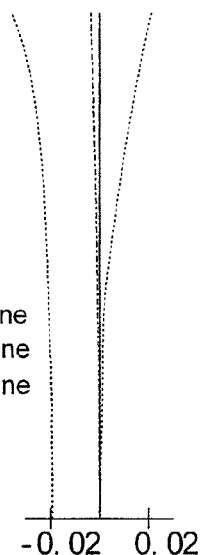
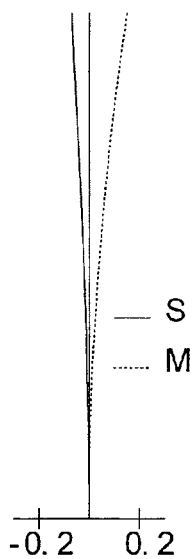
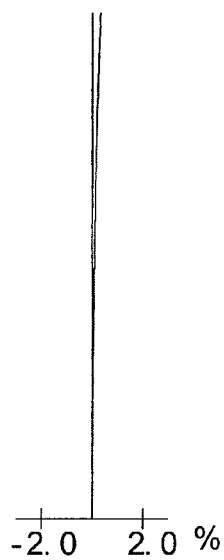
——— d Line
········· g Line
--------- C Line
——— S
········· M
-0.2   0.2
SPHERICAL
ABERRATION
CHROMATIC
ABERRATION
-0.02   0.02
LATERAL
CHROMATIC
ABERRATION
-0.2   0.2
ASTIGMATISM
-2.0   2.0 %
DISTORTION
Fig.30A
Y= 0.00
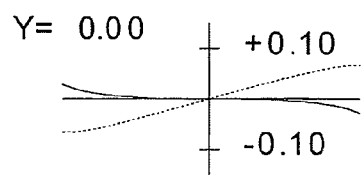
Fig.30B
Y= 7.90
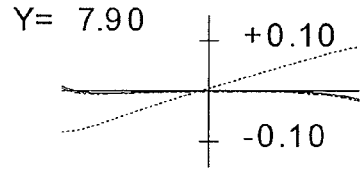
Fig.30C
Y= 11.85
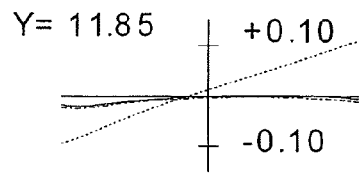
Fig.30D
Y= 14.24
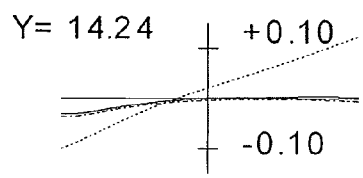
——— d Line
········· g Line
--------- C Line

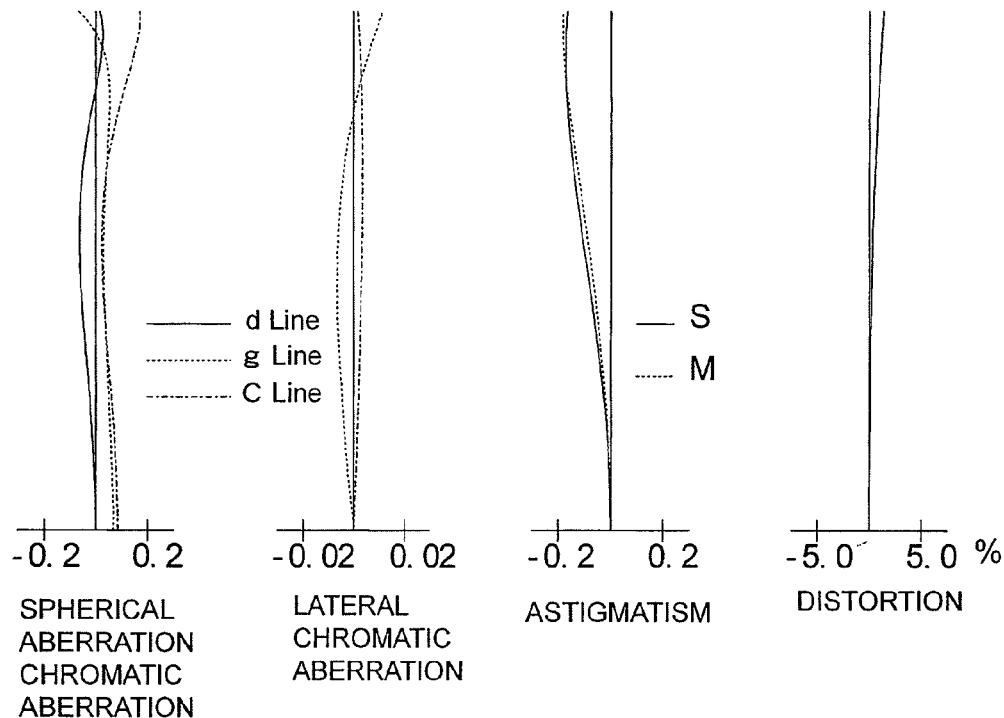
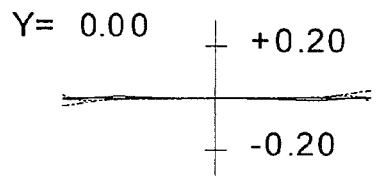
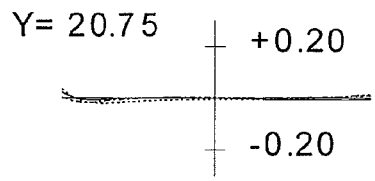
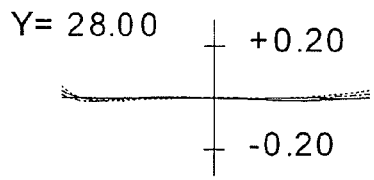
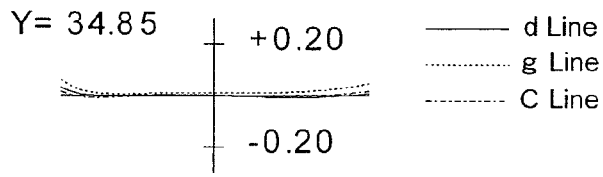

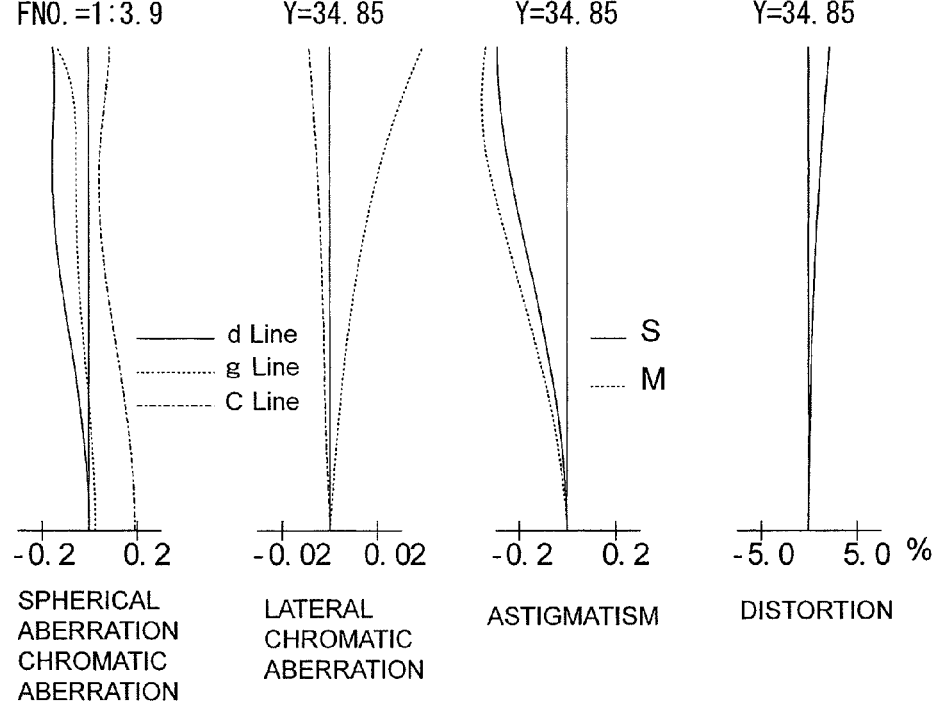
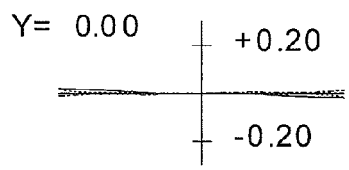
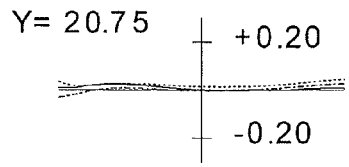
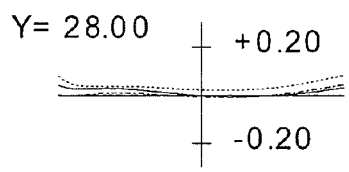
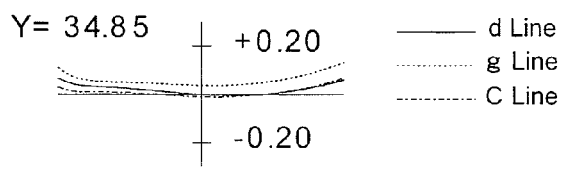

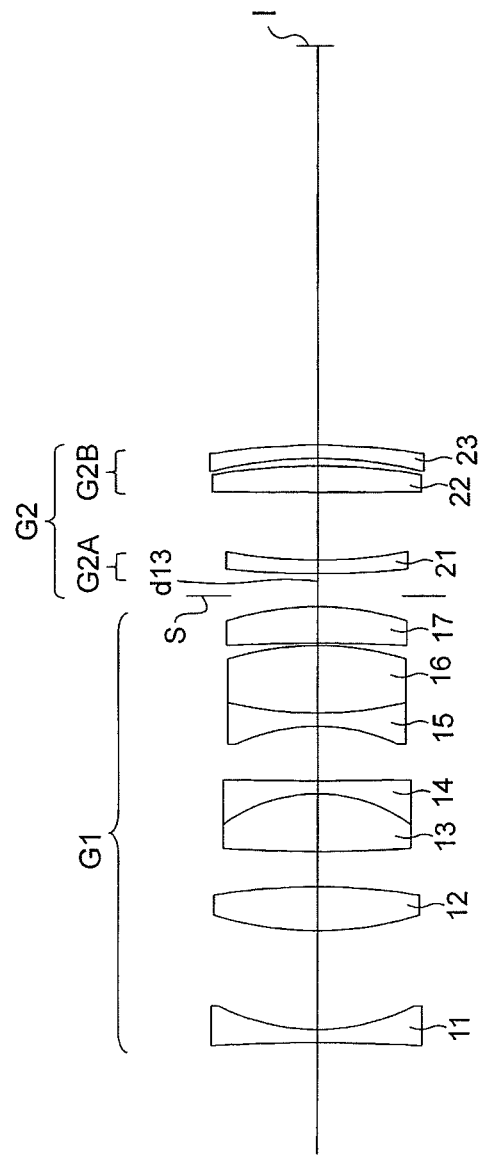

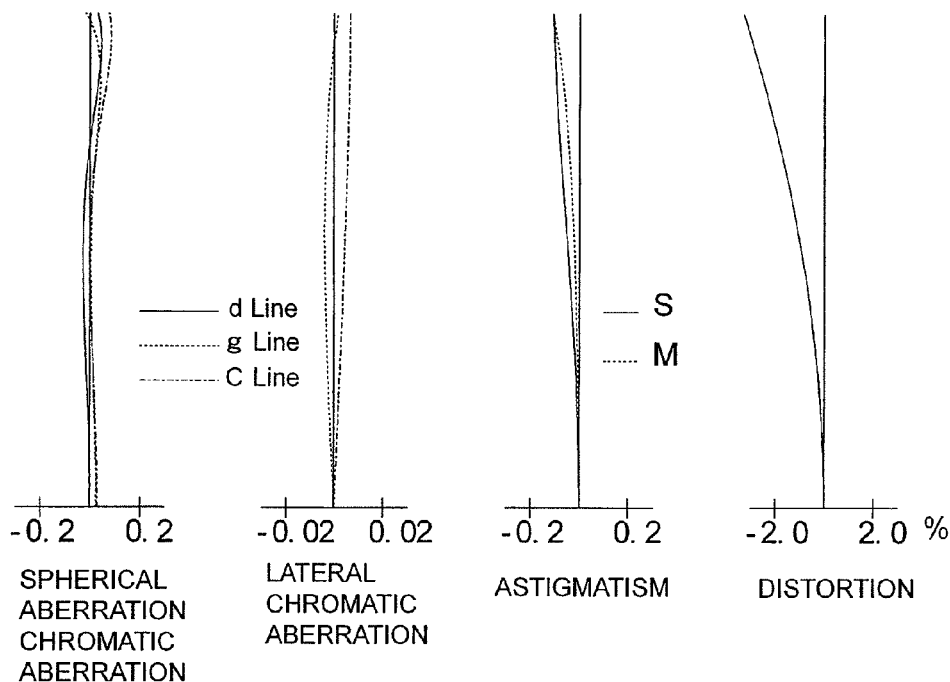
Fig.38A  FNO.=1:2.9  SPHERICAL ABERRATION CHROMATIC ABERRATION
Fig.38B  Y=14.2  LATERAL CHROMATIC ABERRATION
Fig.38C  Y=14.2  ASTIGMATISM
Fig.38D  Y=14.2  DISTORTION
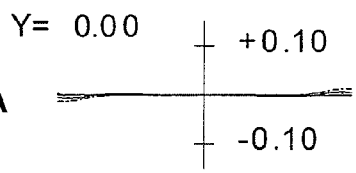
Fig.39A  Y= 0.00
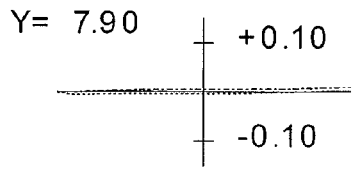
Fig.39B  Y= 7.90
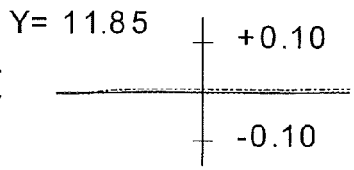
Fig.39C  Y= 11.85
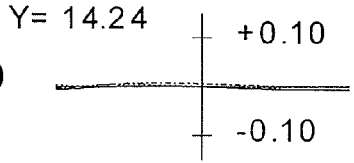
Fig.39D  Y= 14.24

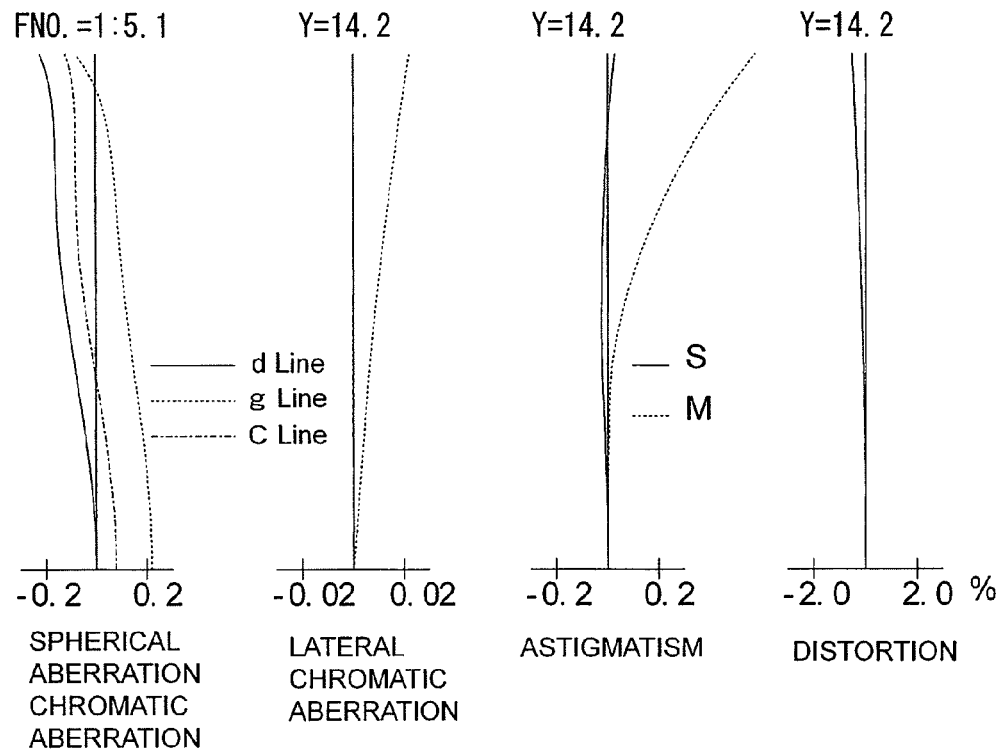
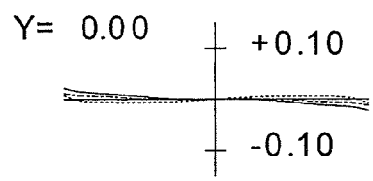
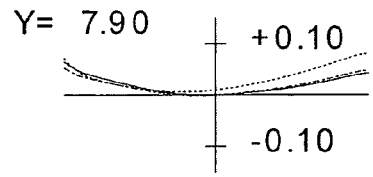
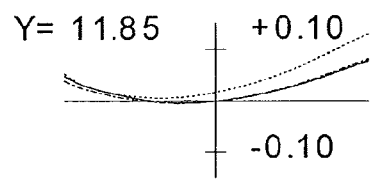
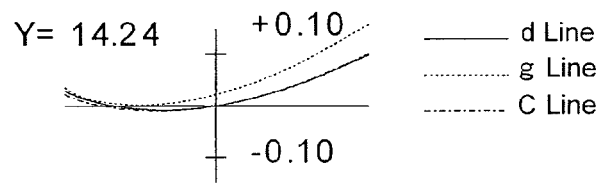

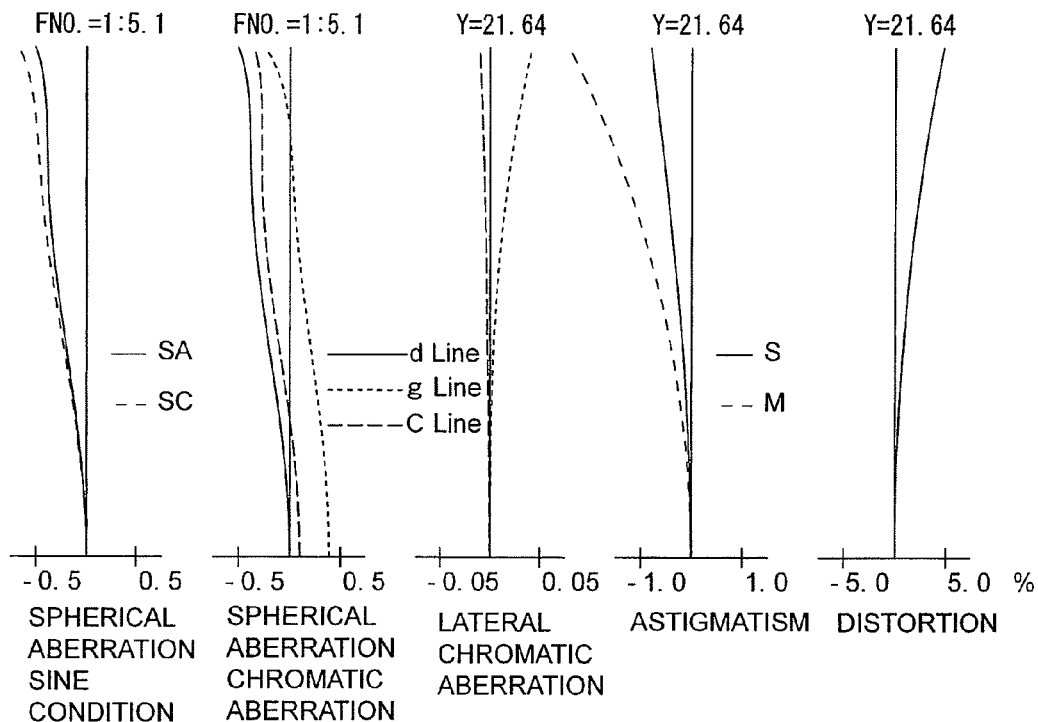
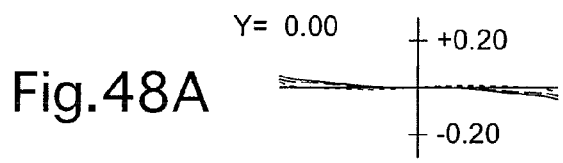
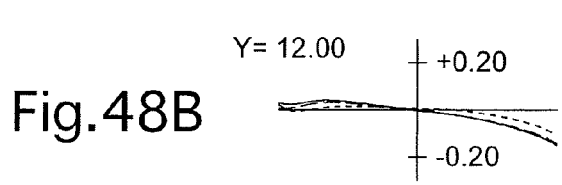
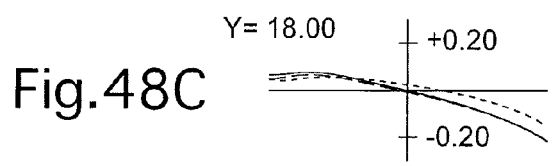
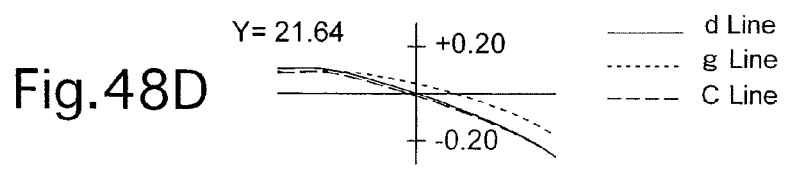

MACRO LENS SYSTEM

BACKGROUND OF THE INVENTION

1. Field of the Invention

The present invention relates to a macro lens system that can be used when carrying out a photographic operation while focusing on an object at infinity to an object at a close distance.

2. Description of Related Art

Various types of focusing systems for a macro lens system are known in the art, for example, a totally telescoping lens system (totally retractable/extendable lens system), a front-lens-group telescoping lens system (front-lens-group retractable/extendable lens system), an internal focusing lens system, and a floating lens system, etc. Out of such types of focusing systems, in an internal-focusing macro lens system in which, during a focusing operation, a frontmost lens group provided closest to the object side is stationary with respect to the imaging plane and a plurality of lens groups other than the frontmost lens group independently move in the optical axis direction, there is the advantage of the center-of-gravity of the lens system having little change during focusing on (photographing) an object at a close distance, due to the overall length of the lens system always being constant, so that the lens barrel does not extend outwards and contact the object (subject) during the focusing operation. However, an internal-focusing macro lens system has the disadvantages of having a large number of lens elements, the optical performance thereof being easily deteriorated, and the mechanism therefor being complicated.

Whereas, in a floating macro lens system, in which the first lens group and the second lens group advance/retract (in the optical axis direction) by mutually different movement amounts, there are advantages such as the number of lens elements being few, the optical quality not easily deteriorating due to manufacturing error, and the structure thereof being simple.

Furthermore, in recent years, macro lens systems are also known to have an image-stabilization function (anti-shake function/shake-correction function) in which part of the lens system thereof is moved (decentered) in directions orthogonal to the optical axis to displace the imaging position in order to correct changes in the object-image position that occur due to hand shake, etc., and a number of floating macro lens systems in which the movement amounts of the first lens group and the second lens group differ when advancing/retracting have been proposed (Japanese Unexamined Patent Publication Nos. H07-152001, H07-261126, 2009-145588 and H09-218349).

However, in Japanese Unexamined Patent Publication No. H07-152001, since the entire second lens group serves as an image-stabilizing lens group (image-shake correction lens group), the weight of the image-stabilizing lens group is great (heavy), thereby increasing the burden on the image-stabilizing mechanism (image-shake correction mechanism) therefor.

In Japanese Unexamined Patent Publication Nos. H07-261126 and 2009-145588, although a plurality of lens elements, that constitute part of a second lens group, serve as an image-stabilizing lens group, a sufficient reduction in weight cannot be achieved, so that a large mechanical burden on the image-stabilizing mechanism still remains. Furthermore, due to the inappropriate refractive-power balance between the image-stabilizing lens group within the second lens group and the remaining lens groups, various aberrations such as spherical aberration and coma, etc., occur, thereby deteriorating the optical quality during an image-stabilizing operation (image-shake correction operation), or the amount of movement of the image-stabilizing lens group becomes too large, so that the burden on the image-stabilizing mechanism increases.

In Japanese Unexamined Patent Publication No. H09-218349, a reduction in weight of the image-stabilizing lens group is achieved configuring part of a first lens group as an image-stabilizing lens group. However, in a floating macro lens system, since the imaging function is mainly provided in the first lens group, if the first lens group is divided into an image-stabilizing sub-lens group and a remaining sub-lens group, the optical quality can easily deteriorate due to manufacturing error.

SUMMARY OF THE INVENTION

The present invention has been devised with consideration to the above problems, and provides a macro lens system which can reduce the burden on the image-stabilizing mechanism (image-shake correction mechanism) by reducing the weight of the image-stabilizing mechanism while appropriately determining the necessary decentering amount, and can achieve a superior optical quality during an image-shake correction (image-stabilizing) operation by suppressing the occurrence of various aberrations such as spherical aberration and coma, etc.

According to an aspect of the present invention, a macro lens system is provided, including a positive first lens group, and a positive or negative second lens group, in that order from the object side, wherein at least the first lens group moves toward the object side when focusing on an object at infinity to an object at a close distance, wherein the second lens group includes a negative first sub-lens group and a positive second sub-lens group, in that order from the object side, wherein the following condition (1) is satisfied:

$$-5.0 < f2A/fi < -0.8 \quad (1),$$

wherein f2A designates the focal length of the first sub-lens group, and fi designates the focal length of the entire the macro lens system when focusing on an object at infinity.

It is desirable for the first sub-lens group to include an image-stabilizing lens group which corrects image shake by moving in directions orthogonal to the optical axis direction to displace the imaging position of the macro lens system.

It is desirable for the first sub-lens group to include a negative single lens element.

It is desirable for the following condition (2) to be satisfied:

$$60 < v2A \quad (2),$$

wherein v2A designates the Abbe number at the d-line of the negative single lens element of the first sub-lens group.

It is desirable for the following condition (3) to be satisfied:

$$0.5 < R2/L2a < 1.2 \quad (3),$$

wherein R2 designates the radius of curvature of the surface on the image side of the lens element provided closest to the image side within the first sub-lens group, and L2a designates the distance from the surface on the image side of the lens element provided closest to the image side within the first sub-lens group, when focusing on an object at infinity, to the imaging plane.

It is desirable for the following condition (4) to be satisfied:

$$|R2/R1| < 0.7 \quad (4),$$

wherein R2 designates the radius of curvature of the surface on the image side of the lens element provided closest to the image side within the first sub-lens group, and R1 designates the radius of curvature of the surface on the object side of the lens element provided closest to the object side within the first sub-lens group.

It is desirable for the second sub-lens group to include a positive lens element having a convex surface on the image side, and a negative lens element having concave surface on the object side, in that order from the object side.

Upon focusing on an object at infinity to an object at a close distance, it is desirable for the first lens group and the second lens group to move toward the object side by mutually different movement amounts.

Alternatively, upon focusing on an object at infinity to an object at a close distance, it is desirable for the first lens group moves toward the object side and the second lens group remains stationary relative to the imaging plane.

It is desirable for the following condition to be satisfied:

$$0<X2/X1<0.9 \quad (5),$$

wherein X1 designates the movement amount of the first lens group during focusing on an object at infinity to an object at a close distance, wherein a positive value of X1 designates movement toward the object side, and X2 designates the movement amount of the second lens group during focusing on an object at infinity to an object at a close distance, wherein a positive value of X2 designates movement toward the object side.

According to the present invention, a macro lens system is achieved, in which the burden on the image-stabilizing mechanism (image-shake correction mechanism) can be reduced by reducing the weight of the image-stabilizing mechanism while appropriately determining the necessary decentering amount, and a superior optical quality can be achieved during an image-shake correction (image-stabilizing) operation by suppressing the occurrence of various aberrations such as spherical aberration and coma, etc.

The present disclosure relates to subject matter contained in Japanese Patent Application Nos. 2012-087206 (filed on Apr. 6, 2012) and 2012-277050 (filed on Dec. 19, 2012), which are expressly incorporated herein in their entireties.

BRIEF DESCRIPTION OF THE DRAWINGS

The present invention will be discussed below in detail with reference to the accompanying drawings, in which:

FIG. 1 shows a lens arrangement of a first numerical embodiment of a macro lens system, when focused on an object at infinity;

FIGS. 2A, 2B, 2C and 2D show various aberrations that occurred in the lens arrangement shown in FIG. 1;

FIGS. 3A, 3B, 3C and 3D show various lateral aberrations that occurred in the lens arrangement shown in FIG. 1;

FIG. 4 shows a lens arrangement of the first numerical embodiment of the macro lens system, when focused on an object at a close distance;

FIG. 7 shows a lens arrangement of a second numerical embodiment of a macro lens system, when focused on an object at infinity;

FIG. 10 shows a lens arrangement of the second numerical embodiment of the macro lens system, when focused on an object at a close distance;

FIGS. 11A, 11B, 11C and 11D show various aberrations that occurred in the lens arrangement shown in FIG. 10;

FIGS. 12A, 12B, 12C and 12D show various lateral aberrations that occurred in the lens arrangement shown in FIG. 10;

FIGS. 14A, 14B, 14C and 14D show various aberrations that occurred in the lens arrangement shown in FIG. 13;

FIGS. 15A, 15B, 15C and 15D show various lateral aberrations that occurred in the lens arrangement shown in FIG. 13;

FIGS. 20A, 20B, 20C and 20D show various aberrations that occurred in the lens arrangement shown in FIG. 19;

FIGS. 21A, 21B, 21C and 21D show various lateral aberrations that occurred in the lens arrangement shown in FIG. 19;

FIG. 22 shows a lens arrangement of the fourth numerical embodiment of the macro lens system, when focused on an object at a close distance;

FIGS. 23A, 23B, 23C and 23D show various aberrations that occurred in the lens arrangement shown in FIG. 22;

FIGS. 24A, 24B, 24C and 24D show various lateral aberrations that occurred in the lens arrangement shown in FIG. 22;

FIG. 25 shows a lens arrangement of a fifth numerical embodiment of a macro lens system, when focused on an object at infinity;

FIGS. 26A, 26B, 26C and 26D show various aberrations that occurred in the lens arrangement shown in FIG. 25;

FIGS. 27A, 27B, 27C and 27D show various lateral aberrations that occurred in the lens arrangement shown in FIG. 25;

FIGS. 29A, 29B, 29C and 29D show various aberrations that occurred in the lens arrangement shown in FIG. 28;

FIGS. 30A, 30B, 30C and 30D show various lateral aberrations that occurred in the lens arrangement shown in FIG. 28;

FIGS. 32A, 32B, 32C and 32D show various aberrations that occurred in the lens arrangement shown in FIG. 31;

FIGS. 33A, 33B, 33C and 33D show various lateral aberrations that occurred in the lens arrangement shown in FIG. 31;

FIGS. 35A, 35B, 35C and 35D show various aberrations that occurred in the lens arrangement shown in FIG. 34;

FIGS. 36A, 36B, 36C and 36D show various lateral aberrations that occurred in the lens arrangement shown in FIG. 34;

FIG. 37 shows a lens arrangement of a seventh numerical embodiment of a macro lens system, when focused on an object at infinity;

FIGS. 38A, 38B, 38C and 38D show various aberrations that occurred in the lens arrangement shown in FIG. 37;

FIGS. 39A, 39B, 39C and 39D show various lateral aberrations that occurred in the lens arrangement shown in FIG. 37;

FIGS. 41A, 41B, 41C and 41D show various aberrations that occurred in the lens arrangement shown in FIG. 40;

FIGS. 42A, 42B, 42C and 42D show various lateral aberrations that occurred in the lens arrangement shown in FIG. 40;

FIGS. 47A, 47B, 47C, 47D and 47E show various aberrations that occurred in the lens arrangement shown in FIG. 46;

FIGS. 48A, 48B, 48C and 48D show various lateral aberrations that occurred in the lens arrangement shown in FIG. 46;

DESCRIPTION OF THE EMBODIMENTS

Figure 49:
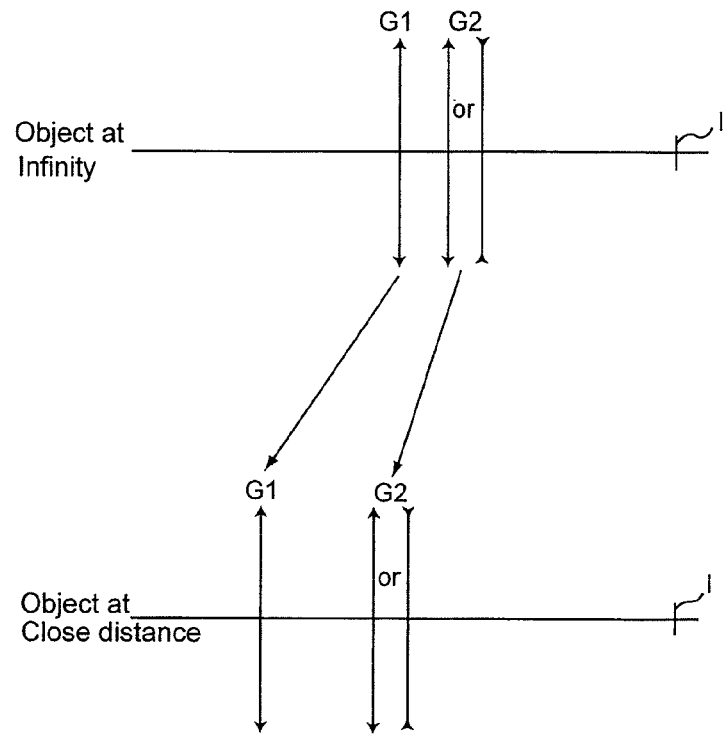
FIG. 49 shows a first moving path of the macro lens system, according to the present invention, during a focusing operation on an object at infinity to an object at a close distance.
Figure 50:
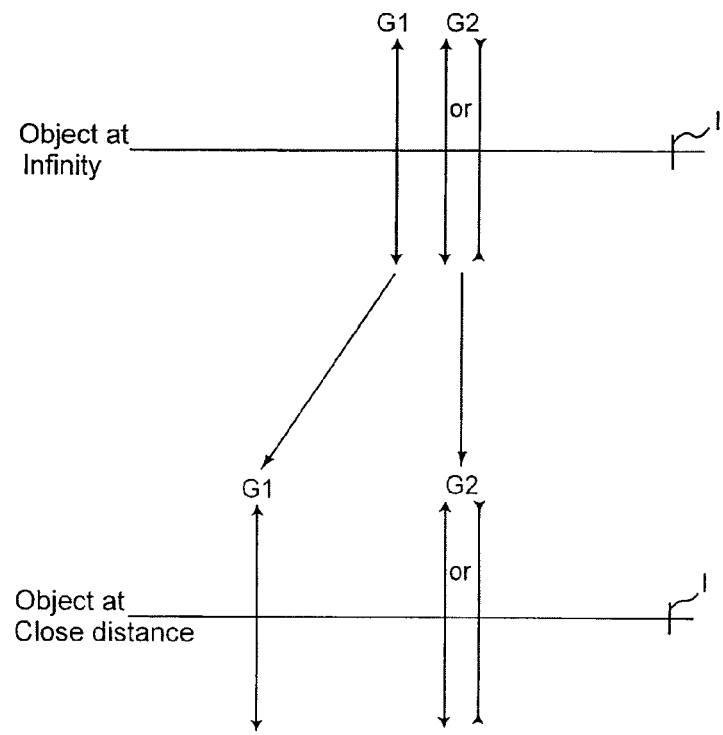
FIG. 50 shows a second moving path of the macro lens system, according to the present invention, during a focusing operation on an object at infinity to an object at a close distance.

The macro lens system, in each of the first through eighth numerical embodiments, as shown in the movement paths of FIGS. 49 and 50, is configured of a positive first lens group G1, and a positive or negative second lens group G2, in that order from the object side. The second lens group G2 is provided with a positive refractive power in the first, second, fifth and seventh numerical embodiments, and with a negative refractive power in the third, fourth, sixth and eighth numerical embodiments. 'I' designates the imaging plane.

In each of the first through seventh numerical embodiments of the macro lens system, the first lens group G1 and the second lens group G2 respectively move (advance) toward the object side by different movement amounts (advancing amounts) when focusing on an object at infinity to an object at a close distance. The movement amount (advancing amount) of the first lens group G1 is greater than that of the second lens group G2.

In the eighth numerical embodiment of the macro lens system, the first lens group G1 moves (advances) toward the object side and the second lens group G2 remains stationary relative to the imaging plane I (i.e., the second lens group G2 does not move in the optical axis direction) when focusing on an object at infinity to an object at a close distance.

In each of the first through eighth numerical embodiments, the first lens group G1 is configured of a negative lens element 11, a positive lens element 12, a positive lens element 13, a negative lens element 14, a negative lens element 15, a positive lens element 16, and a positive lens element 17, in that order from the object side.

The positive lens element 13 and the negative lens element 14 are not bonded to each other in the first through third numerical embodiments, whereas the positive lens element 13 and the negative lens element 14 are bonded to each other to constitute a cemented lens in the fourth through eighth numerical embodiments.

The negative lens element 15 and the positive lens element 16 are bonded to each other to constitute a cemented lens in each of the first through eighth numerical embodiments.

An aspherical surface is formed on the image side of the positive lens element 17 in each of the first through eighth numerical embodiments.

A diaphragm S which moves in the optical axis direction integrally with the movement of the first lens group G1 is positioned on the image side of the positive lens element 17 (between the first lens group G1 and the second lens group G2) in the first and seventh numerical embodiments, and the diaphragm S is positioned in between the negative lens element 14 and the negative lens element 15 (within the first lens group G1) in the second through sixth and eighth numerical embodiments.

The second lens group G2 is configured of a negative first sub-lens group G2A and a positive second sub-lens group G2B, in that order from the object side. In each of the first through fifth, seventh and eighth numerical embodiments, the first sub-lens group G2A and the second sub-lens group G2B are divided at the position at the maximum air-distance therebetween.

In each of the first through eighth numerical embodiments, the first sub-lens group G2A is configured of a negative single lens element 21.

In the first and second numerical embodiments, the negative single lens element 21 has an aspherical surface on the object side thereof, and in the third through eighth numerical embodiments, the negative single lens element 21 has a spherical surface on each side thereof (not an aspherical surface).

In each of the first through eighth numerical embodiments, the first sub-lens group G2A (negative single lens element 21) serves as an image-stabilizing lens group (image-shake correction lens group) which corrects image shake by moving (decentering) in directions orthogonal to the optical axis direction to thereby displace the imaging position.

In each of the first through eighth numerical embodiments, the second sub-lens group G2B is configured of a positive lens element (a positive lens element having a convex surface on the image side) 22, and a negative lens element (a negative lens element having a concave surface on the object side) 23, in that order from the object side.

In the first through seventh numerical embodiments, the macro lens system is configured of a positive first lens group G1 and a positive or negative second lens group G2, in that order from the object side, and employs a floating focusing method in which, upon focusing on an object at infinity to an object at a close distance, the first lens group G1 and the second lens group G2 respectively move (advance) toward the object side by mutually different movement amounts (advancing amounts). Accordingly, the number of lens elements can be reduced, the focusing mechanism can be simplified, and deterioration in the optical quality caused by manufacturing error can be prevented.

In the eighth numerical embodiment, the macro lens system is configured of a positive first lens group G1 and a positive or negative second lens group G2, in that order from the object side, and employs a focusing method in which, upon focusing on an object at infinity to an object at a close distance, the first lens group G1 moves (advances) toward the object side, and the second lens group G2 remains stationary (does not move in the optical axis direction) relative to the imaging plane I. Accordingly, the mechanical structure of the focusing mechanism can be simplified. In particular, with the first sub-lens group G2A of the second lens group G2 serving as an image-stabilizing lens group, since the second lens group G2 as a whole, which includes the image-stabilizing lens group (first sub-lens group G2A), remains stationary during a focusing operation, the mechanical structure of the image-stabilizing unit can be simplified, and deterioration in the optical quality during an image-stabilizing operation can be prevented.

In the macro lens system of the illustrated embodiments, the second lens group G2 is divided into the negative first sub-lens group G2A and the positive second sub-lens group G2B, and the first sub-lens group G2A serves as an image-stabilizing lens group which corrects image shake by moving in directions orthogonal to the optical axis to thereby displace the imaging position. Accordingly, the weight of the image-stabilizing lens group can be reduced so that the burden on the image-stabilizer mechanism (image-shake correction mechanism) can be reduced. Furthermore, by configuring the first sub-lens group G2A, which constitutes the image-stabilizing lens group, as a single negative lens element 21, the weight of the image-stabilizing lens group can be further reduced, and the burden on the image-stabilizer mechanism (image-shake correction mechanism) can be further reduced. Furthermore, by configuring the second sub-lens group G2B of the positive lens element (a positive lens element having a convex surface on the image side) 22, and the negative lens element (a negative lens element having a concave surface on the object side) 23, in that order from the object side, changes in astigmatism and field curvature can be reduced, thereby improving the optical quality during an image-stabilizing operation.

Condition (1) specifies the ratio of the focal length of the first sub-lens group G2A to the focal length of the entire macro lens system when focusing on an object at infinity. By satisfying condition (1), the weight and the amount of movement (in the optical axis direction) of the first sub-lens group G2A (the image-stabilizing lens group) is reduced, thereby reducing the burden on the image-stabilizer mechanism, and suppressing occurrence of various aberrations such as spherical aberration and coma so that a superior optical quality can be achieved during an image-stabilizing operation.

If the upper limit of condition (1) is exceeded, the refractive power of the first sub-lens group G2A becomes excessively strong, so that various aberrations such as spherical aberration and coma, etc., occur, thereby deteriorating the optical quality during an image-stabilizing operation.

If the lower limit of condition (1) is exceeded, the optical power of the first sub-lens group G2A becomes too weak and the movement amount of the first sub-lens group G2A during an image-stabilizing operation becomes excessively large, thereby increasing the burden on the image-stabilizer mechanism.

As described above, in each of the first through seventh numerical embodiments, the first sub-lens group G2A (image-stabilizing lens group) is configured of the single negative lens element 21.

Condition (2) specifies the Abbe number at the d-line of the negative single lens element 21 with the first sub-lens group G2A (the image-stabilizing lens group) configured of the negative single lens element 21. By satisfying condition (2), occurrence of chromatic aberration during an image-stabilizing operation is suppressed, so that a superior optical quality can be achieved.

If the lower limit of condition (2) is exceeded, a large amount of chromatic aberration occurs during an image-stabilizing operation, thereby deteriorating the optical quality.

The first sub-lens group G2A (image-stabilizing lens group) can alternatively be configured of a plurality of lens elements, instead of the single negative lens element 21.

Condition (3) specifies the ratio of the radius of curvature of the surface on the image side of the lens element that is provided closest to the image side within the first sub-lens group G2A, to the distance between the imaging plane I and the surface on the image side of the lens element that is provided closest to the image side within the first sub-lens group G2A when focusing on an object at infinity, in which the first sub-lens group G2A configured of the negative single lens element 21 or a plurality of lens elements. By satisfying condition (3), the center of curvature of the first sub-lens group G2A (image-stabilizing lens group) is positioned in the close vicinity of the imaging plane I, so that changes in field curvature and astigmatism during an image-stabilizing operation can be reduced, thereby achieving a superior optical quality.

If either of the upper or lower limits of condition (3) is exceeded, the center of curvature of the first sub-lens group G2A (image-stabilizing lens group) becomes positioned far away from the imaging plane I, so that large amounts of field curvature and astigmatism occur during an image-stabilizing operation, thereby deteriorating the optical quality.

Condition (4) specifies the ratio of radius of curvature of the surface on the image side of the lens element provided closest to the image side within the first sub-lens group G2A to the radius of curvature of the surface on the object side of the lens element provided closest to the object side within the first sub-lens group G2A, with the first sub-lens group G2A configured of the negative single lens element 21 or the plurality of lens elements. By satisfying condition (4), a suitable radius of curvature of the surface on the object side of the lens element provided closest to the object side within the first sub-lens group G2A is achieved, so that occurrence of spherical aberration and coma during an image-stabilizing operation is suppressed, thereby achieving a superior optical quality.

If the upper limit of condition (4) is exceeded, the radius of curvature of the surface on the object side of the lens element provided closest to the object side within the first sub-lens group G2A becomes too small, so that large amounts of spherical aberration and coma occur during an image-stabilizing operation, thereby deteriorating the optical quality.

Condition (5) specifies the ratio of the amount of movement of the first lens group G1 to that of the second lens group G2 when focusing on an object at infinity to an object at a close distance. By satisfying condition (5), aberration fluctuations (especially field curvature) that occur when focusing on an object at a close distance can be favorably corrected.

If the upper limit of condition (5) is exceeded, the effect of the floating focusing method becomes insufficient, so that a large amount of field curvature occurs.

If the lower limit of condition (5) is exceeded, the effect of the floating focusing method becomes excessively strong, so that field curvature is over-corrected.

Specific numerical embodiments will be herein discussed. In the aberration diagrams, the lateral aberration diagrams, and the tables, the d-line, g-line, and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during focusing) are shown in the following order: infinite focal position to a close-distance focal position (minimum focal position).

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

[Numerical Embodiment 1]

FIGS. 1 through 6D and Tables 1 through 4 show a first numerical embodiment of a macro lens system according to the present invention. FIG. 1 shows a lens arrangement of the first numerical embodiment of the macro lens system when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment of the zoom lens system when focused on an object at a close distance. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 1 shows the lens surface data, Table 2 shows various data of the macro lens system, Table 3 shows aspherical surface data, and Table 4 shows various data of the lens groups of the first numerical embodiment of the macro lens system according to the present invention.

The macro lens system of the first numerical embodiment is configured of a positive first lens group G1 and a positive second lens group G2, in that order from the object side.

The first lens group G1 is configured of a negative meniscus lens element 11 having a convex surface on the object side, a biconvex positive lens element 12, a positive meniscus lens element 13 having a convex surface on the object side, a negative meniscus lens element 14 having a convex surface on the object side, a cemented lens formed from a biconcave negative lens element 15 and a biconvex positive lens element 16, a biconvex positive lens element 17, and an aperture diaphragm S, in that order from the object side. The biconvex positive lens element 17 has an aspherical surface formed on the image side thereof.

The second lens group G2 is configured of a negative first sub-lens group G2A and a positive second sub-lens group G2B, in that order from the object side.

The first sub-lens group G2A is configured of a biconcave negative single lens element 21. The biconcave negative single lens element 21 is provided with an aspherical surface on the object side. The first sub-lens group G2A (the biconcave negative single lens element 21) serves as an image-stabilizing lens group (image-shake correction lens group) which corrects image shake by moving in directions orthogonal to the optical axis to thereby displace the imaging position.

The second sub-lens group G2B is configured of a biconvex positive lens element (a positive lens element having a convex surface on the image side) 22, and a negative meniscus lens element having a convex surface on the image side (a negative lens element having a concave surface on the object side) 23, in that order from the object side.

TABLE 1

SURFACE DATA

| Surf. No. | r | d | N(d) | vd |
|---|---|---|---|---|
| 1 | 307.298 | 1.300 | 1.63930 | 44.9 |
| 2 | 26.439 | 2.700 | | |
| 3 | 26.256 | 5.710 | 1.78800 | 47.5 |
| 4 | −122.512 | 0.200 | | |
| 5 | 27.689 | 3.900 | 1.80420 | 46.5 |
| 6 | 61.838 | 0.890 | | |
| 7 | 3339.978 | 1.200 | 1.53172 | 48.8 |
| 8 | 20.767 | 5.790 | | |
| 9 | −27.912 | 1.200 | 1.60342 | 38.0 |
| 10 | 25.103 | 3.830 | 1.49700 | 81.6 |
| 11 | −287.270 | 0.200 | | |
| 12 | 43.279 | 3.330 | 1.61881 | 63.8 |
| 13* | −33.323 | 1.000 | | |
| 14(Diaphragm) | ∞ | d14 | | |
| 15* | −179.730 | 1.200 | 1.61881 | 63.8 |
| 16 | 39.888 | 11.210 | | |
| 17 | 97.181 | 5.060 | 1.80420 | 46.5 |
| 18 | −46.032 | 1.100 | | |
| 19 | −38.096 | 1.200 | 1.69895 | 30.0 |
| 20 | −77.091 | — | | |

The asterisk (*) designates an aspherical surface which is rotationally symmetrical with respect to the optical axis.

TABLE 2

MACRO LENS SYSTEM DATA

| | Infinite Focal Position | Close-Distance (−1.00:1) Focal Position |
|---|---|---|
| FNO. | 2.9 | 5.6 |
| f | 59.98 | 61.13 |
| W | 20.0 | 11.0 |
| Y | 21.64 | 21.64 |
| fB | 37.11 | 82.21 |
| L | 90.13 | 146.51 |
| d14 | 2.000 | 13.276 |

TABLE 3

Aspherical Surface Data

| Surf. No. | K | A4 | A6 |
|---|---|---|---|
| 13 | 0.000 | 0.1153E−04 | 0.1789E−07 |
| 15 | 0.000 | 0.2341E−05 | −0.1220E−08 |

TABLE 4

LENS GROUP DATA

| Lens Group | 1st Surf. | Focal Length |
|---|---|---|
| 1 | 1 | 50.789 |
| Sub-1(2) | 15 | −52.642 |
| Sub-2(2) | 17 | 60.669 |

[Numerical Embodiment 2]

FIGS. 7 through 12D and Tables 5 through 8 show a second numerical embodiment of a macro lens system according to the present invention. FIG. 7 shows a lens arrangement of the second numerical embodiment of the macro lens system when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIG. 10 shows a lens arrangement of the second numerical embodiment of the zoom lens system when focused on an object at a close distance. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 5 shows the lens surface data, Table 6 shows various data of the macro lens system, Table 7 shows aspherical surface data, and Table 8 shows various data of the lens groups of the second numerical embodiment of the macro lens system according to the present invention.

The fundamental lens arrangement of the second numerical embodiment is the same as that of the first numerical embodiment, except for the following aspects:

(1) The negative lens element 11 of the first lens group G1 is configured of a biconcave negative lens element.

(2) The aperture diaphragm S of the first lens group G1 is positioned between the negative meniscus lens element 14 and the biconcave negative lens element 15.

TABLE 5

SURFACE DATA

| Surf. No. | r | d | N(d) | vd |
|---|---|---|---|---|
| 1 | −617.864 | 1.300 | 1.72000 | 46.0 |
| 2 | 27.595 | 2.810 | | |
| 3 | 27.544 | 6.020 | 1.77250 | 49.6 |
| 4 | −90.280 | 0.230 | | |
| 5 | 25.506 | 3.900 | 1.80420 | 46.5 |
| 6 | 77.524 | 0.800 | | |
| 7 | 1665.406 | 1.200 | 1.54072 | 47.2 |
| 8 | 19.968 | 3.400 | | |
| 9(Diaphragm) | ∞ | 3.000 | | |
| 10 | −24.803 | 1.200 | 1.56732 | 42.8 |
| 11 | 22.251 | 4.330 | 1.49700 | 81.6 |
| 12 | −170.272 | 0.200 | | |
| 13 | 43.161 | 4.590 | 1.55332 | 71.7 |
| 14* | −29.414 | d14 | | |
| 15* | −210.171 | 1.200 | 1.55332 | 71.7 |
| 16 | 34.532 | 5.920 | | |

TABLE 5-continued

SURFACE DATA

| Surf. No. | r | d | N(d) | vd |
|---|---|---|---|---|
| 17 | 67.511 | 5.060 | 1.80420 | 46.5 |
| 18 | −48.991 | 0.850 | | |
| 19 | −42.109 | 1.200 | 1.69895 | 30.0 |
| 20 | −142.815 | — | | |

The asterisk (*) designates an aspherical surface which is rotationally symmetrical with respect to the optical axis.

TABLE 6

MACRO LENS SYSTEM DATA

| | Infinite Focal Position | Close-Distance (−1.00:1) Focal Position |
|---|---|---|
| FNO. | 2.9 | 5.7 |
| f | 57.30 | 57.32 |
| W | 21.0 | 11.3 |
| Y | 21.64 | 21.64 |
| fB | 39.81 | 80.24 |
| L | 90.04 | 143.94 |
| d14 | 3.020 | 16.495 |

TABLE 7

Aspherical Surface Data

| Surf. No. | K | A4 | A6 |
|---|---|---|---|
| 14 | 0.000 | 0.1311E−04 | 0.2122E−07 |
| 15 | 0.000 | 0.2714E−05 | 0.1180E−08 |

TABLE 8

LENS GROUP DATA

| Lens Group | 1st Surf. | Focal Length |
|---|---|---|
| 1 | 1 | 51.180 |
| Sub-1(2) | 15 | −53.508 |
| Sub-2(2) | 17 | 59.880 |

[Numerical Embodiment 3]

Figure 5A:
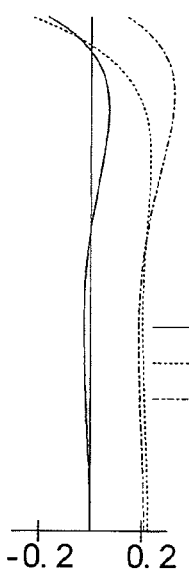
FIGS. 5A, 5B, 5C and 5D show various aberrations that occurred in the lens arrangement shown in FIG. 4.
Figure 5B:
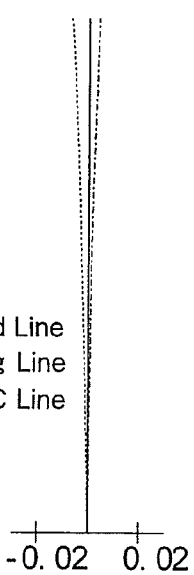
Figure 5C:
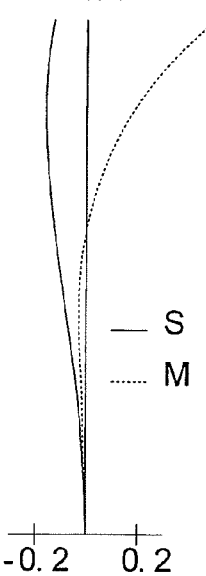
Figure 5D:
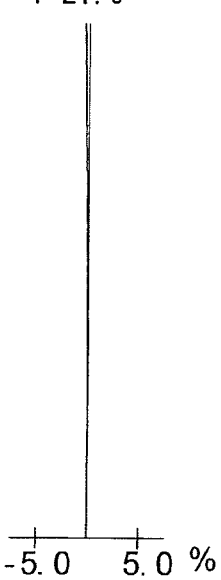
Figure 6A:
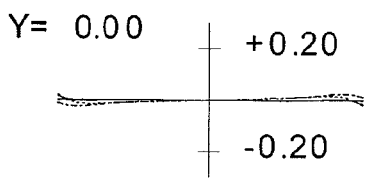
FIGS. 6A, 6B, 6C and 6D show various lateral aberrations that occurred in the lens arrangement shown in FIG. 4.
Figure 6B:
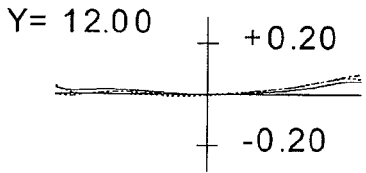
Figure 6C:
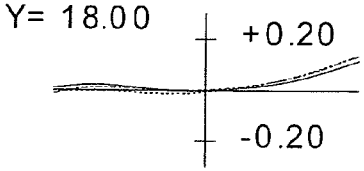
Figure 6D:
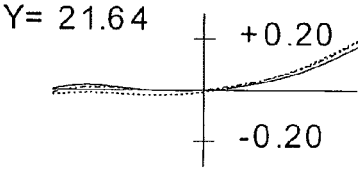
Figure 8A:
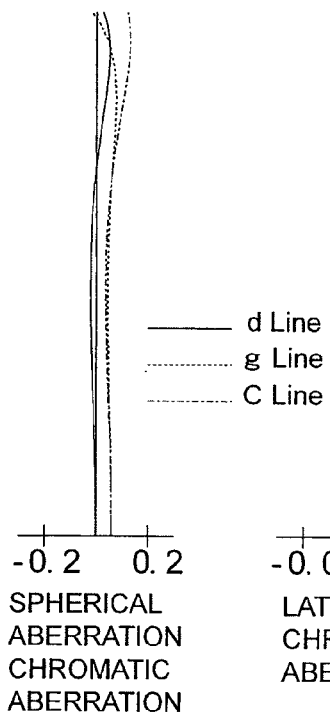
FIGS. 8A, 8B, 8C and 8D show various aberrations that occurred in the lens arrangement shown in FIG. 7.
Figure 8B:
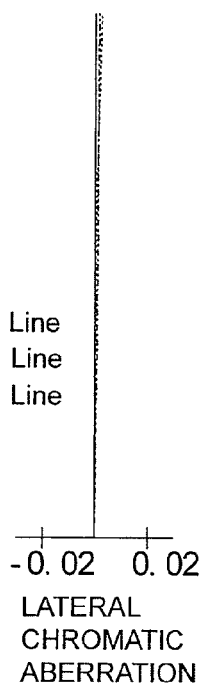
Figure 8C:
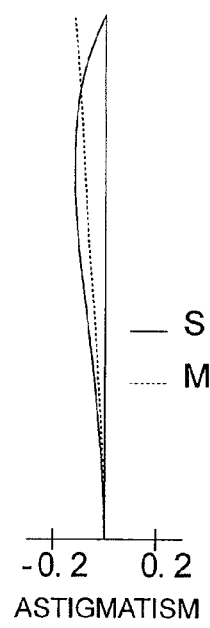
Figure 8D:
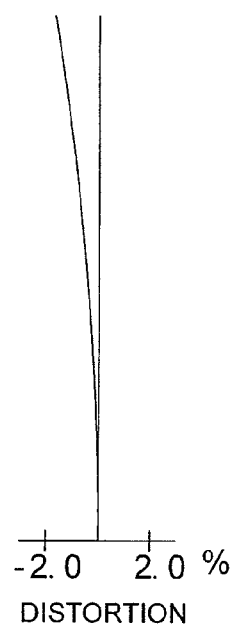
Figure 9A:
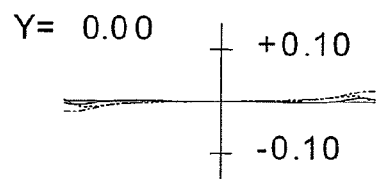
FIGS. 9A, 9B, 9C and 9D show various lateral aberrations that occurred in the lens arrangement shown in FIG. 7.
Figure 9B:
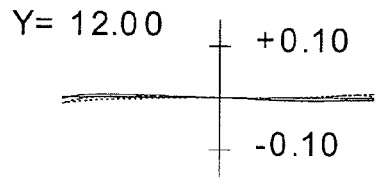
Figure 9C:
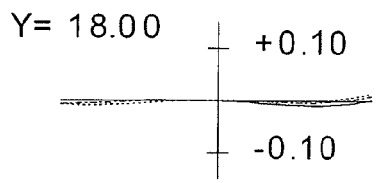
Figure 9D:
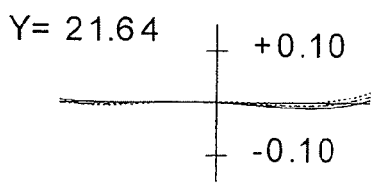
Figure 13:
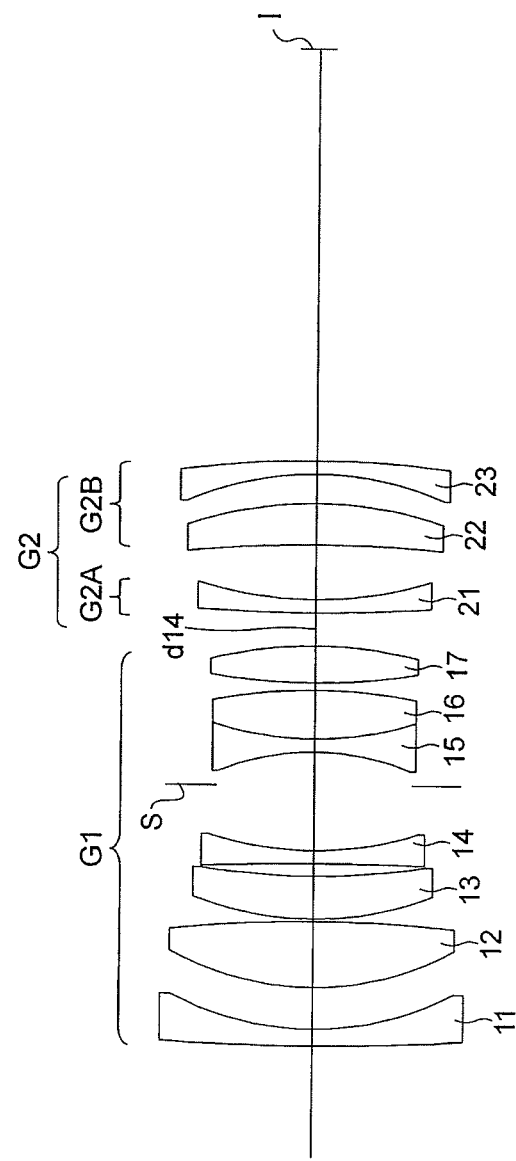
FIG. 13 shows a lens arrangement of a third numerical embodiment of a macro lens system, when focused on an object at infinity.
Figure 16:
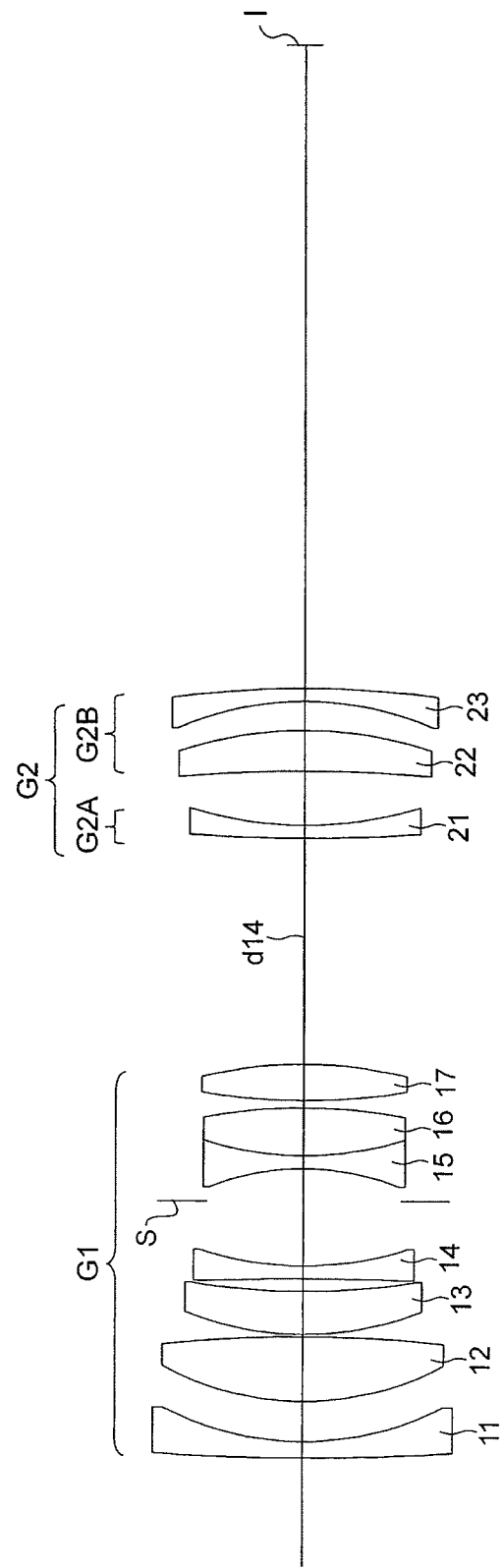
FIG. 16 shows a lens arrangement of the third numerical embodiment of the macro lens system, when focused on an object at a close distance.
Figures 17A, 17B, 17C, 17D:
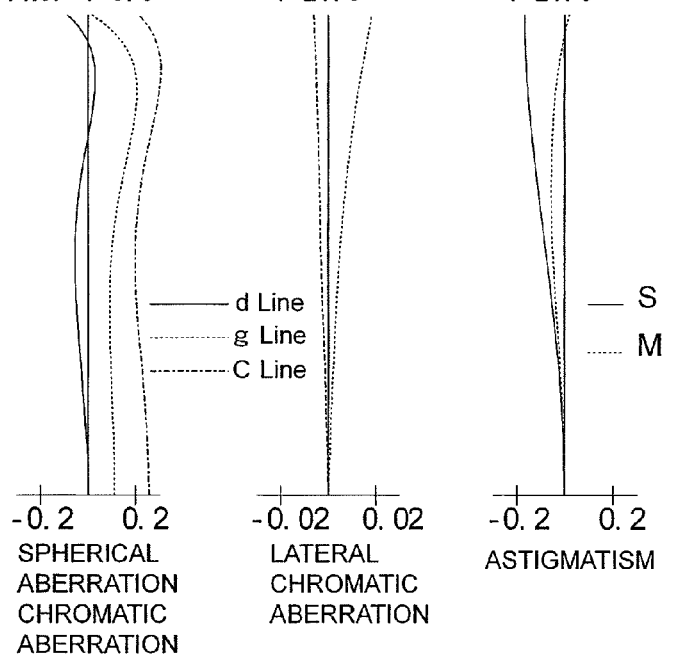
FIGS. 17A, 17B, 17C and 17D show various aberrations that occurred in the lens arrangement shown in FIG. 16.
Figure 18A:
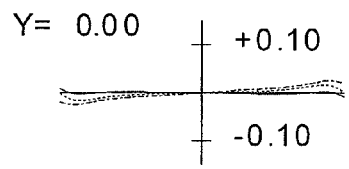
FIGS. 18A, 18B, 18C and 18D show various lateral aberrations that occurred in the lens arrangement shown in FIG. 16.
Figure 18B:
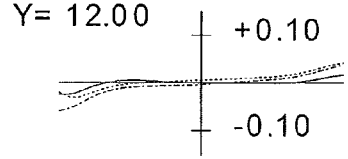
Figure 18C:
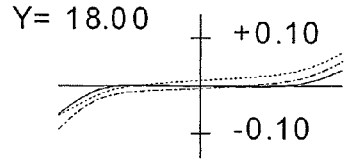
Figure 18D:
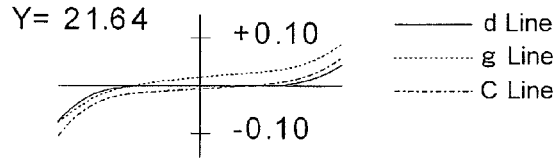

FIGS. 13 through 18D and Tables 9 through 12 show a third numerical embodiment of a macro lens system according to the present invention. FIG. 13 shows a lens arrangement of the third numerical embodiment of the macro lens system when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows a lens arrangement of the third numerical embodiment of the zoom lens system when focused on an object at a close distance. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 9 shows the lens surface data, Table 10 shows various data of the macro lens system, Table 11 shows aspherical surface data, and Table 12 shows various data of the lens groups of the third numerical embodiment of the macro lens system according to the present invention.

The fundamental lens arrangement of the third numerical embodiment is the same as that of the second numerical embodiment, except for the following aspects:

(1) The second lens group G2 has a negative (rather than a positive) refractive power.

(2) The negative lens element 11 of the first lens group G1 is a negative meniscus lens element having a convex surface on the object side.

(3) The negative lens element 14 of the first lens group G1 is a biconcave negative lens element.

(4) The negative single lens element 21 of the first sub-lens group G2A is a negative single meniscus lens element having a convex surface on the object side, and each side thereof has a spherical surface (rather than an aspherical surface).

(5) The positive lens element (the positive lens element having a convex surface on the image side) 22 of the second sub-lens group G2B is a positive meniscus lens element having a convex surface on the image side.

TABLE 9

SURFACE DATA

| Surf. No. | r | d | N(d) | νd |
|---|---|---|---|---|
| 1 | 229.172 | 1.500 | 1.80420 | 46.5 |
| 2 | 28.742 | 3.740 | | |
| 3 | 27.868 | 5.930 | 1.80420 | 46.5 |
| 4 | −126.789 | 0.200 | | |
| 5 | 30.891 | 3.900 | 1.72916 | 54.7 |
| 6 | 68.656 | 1.130 | | |
| 7 | −303.885 | 1.200 | 1.54072 | 47.2 |
| 8 | 32.914 | 5.890 | | |
| 9(Diaphragm) | ∞ | 3.000 | | |
| 10 | −24.477 | 1.200 | 1.67270 | 32.2 |
| 11 | 31.658 | 4.390 | 1.49700 | 81.6 |
| 12 | −49.563 | 0.680 | | |
| 13 | 60.873 | 3.330 | 1.80420 | 46.5 |
| 14* | −38.410 | d14 | | |
| 15 | 154.720 | 1.200 | 1.59282 | 68.6 |
| 16 | 36.933 | 4.980 | | |
| 17 | −125.739 | 3.730 | 1.79950 | 42.3 |
| 18 | −37.452 | 2.650 | | |
| 19 | −30.590 | 1.200 | 1.51742 | 52.2 |
| 20 | −95.184 | — | | |

The asterisk (*) designates an aspherical surface which is rotationally symmetrical with respect to the optical axis.

TABLE 10

MACRO LENS SYSTEM DATA

| | Infinite Focal Position | Close-Distance (−1.00:1) Focal Position |
|---|---|---|
| FNO. | 2.9 | 5.5 |
| f | 60.25 | 50.44 |
| W | 19.5 | 10.9 |
| Y | 21.64 | 21.64 |
| fB | 37.17 | 58.91 |
| L | 90.02 | 129.54 |
| d14 | 3.000 | 20.781 |

TABLE 11

Aspherical Surface Data

| Surf. No. | K | A4 | A6 |
|---|---|---|---|
| 14 | 0.000 | 0.8142E−05 | 0.7676E−08 |

TABLE 12

LENS GROUP DATA

| Lens Group | 1st Surf. | Focal Length |
|---|---|---|
| 1 | 1 | 43.385 |
| Sub-1(2) | 15 | −82.147 |
| Sub-2(2) | 17 | 243.281 |

[Numerical Embodiment 4]

Figure 19:
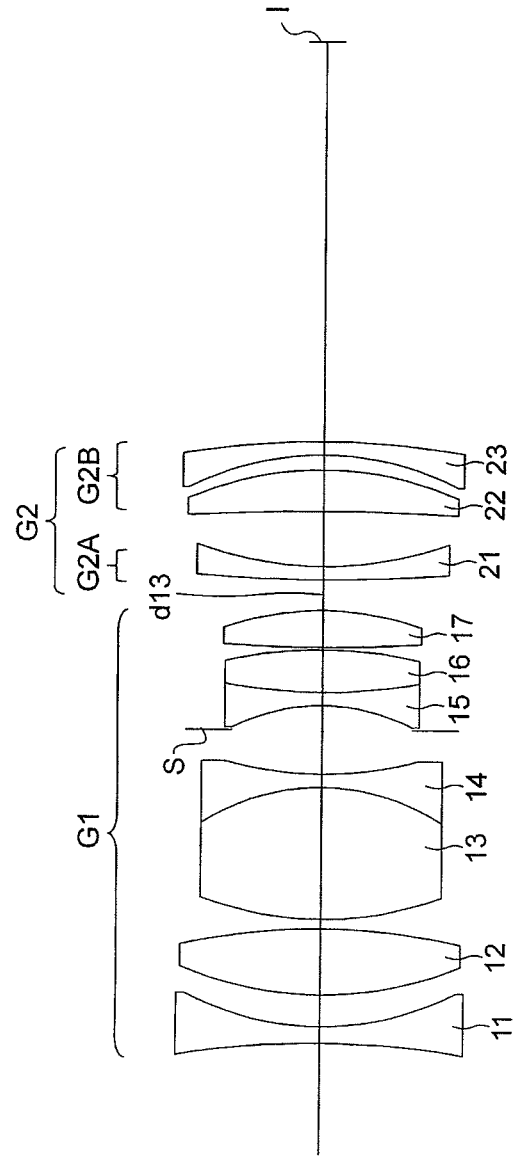
FIG. 19 shows a lens arrangement of a fourth numerical embodiment of a macro lens system, when focused on an object at infinity.

FIGS. 19 through 24D and Tables 13 through 16 show a fourth numerical embodiment of a macro lens system according to the present invention. FIG. 19 shows a lens arrangement of the fourth numerical embodiment of the macro lens system when focused on an object at infinity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows a lens arrangement of the fourth numerical embodiment of the zoom lens system when focused on an object at a close distance. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 13 shows the lens surface data, Table 14 shows various data of the macro lens system, Table 15 shows aspherical surface data, and Table 16 shows various data of the lens groups of the fourth numerical embodiment of the macro lens system according to the present invention.

The fundamental lens arrangement of the fourth numerical embodiment is the same as that of the third numerical embodiment, except for the following aspects:

(1) The negative lens element 11 of the first lens group G1 is a biconcave negative lens element.

(2) The positive lens element 13 of the first lens group G1 is a biconvex positive lens element and is bonded to the biconcave negative lens element 14.

TABLE 13

SURFACE DATA

| Surf. No. | r | d | N(d) | νd |
|---|---|---|---|---|
| 1 | −81.299 | 1.500 | 1.77250 | 49.6 |
| 2 | 27.396 | 2.860 | | |
| 3 | 34.199 | 5.930 | 1.81600 | 46.6 |
| 4 | −58.425 | 0.850 | | |
| 5 | 32.187 | 11.940 | 1.59282 | 68.6 |
| 6 | −20.590 | 1.200 | 1.51823 | 59.0 |
| 7 | 34.747 | 4.000 | | |
| 8(Diaphragm) | ∞ | 2.170 | | |
| 9 | −18.484 | 1.200 | 1.67270 | 32.2 |
| 10 | 50.940 | 3.850 | 1.49700 | 81.6 |
| 11 | −40.406 | 0.200 | | |
| 12 | 125.989 | 3.330 | 1.77250 | 49.6 |
| 13* | −27.185 | d13 | | |
| 14 | 149.524 | 1.200 | 1.48749 | 70.4 |
| 15 | 34.408 | 4.980 | | |
| 16 | −207.621 | 3.730 | 1.80518 | 25.5 |
| 17 | −31.184 | 1.340 | | |
| 18 | −27.722 | 1.200 | 1.80518 | 25.5 |
| 19 | −78.969 | — | | |

The asterisk (*) designates an aspherical surface which is rotationally symmetrical with respect to the optical axis.

TABLE 14

MACRO LENS SYSTEM DATA

|  | Infinite Focal Position | Close-Distance (−1.00:1) Focal Position |
|---|---|---|
| FNO. | 2.9 | 5.3 |
| f | 55.00 | 44.59 |
| W | 21.2 | 12.4 |
| Y | 21.64 | 21.64 |
| fB | 36.00 | 44.44 |
| L | 90.28 | 124.04 |
| d13 | 2.800 | 28.117 |

TABLE 15

Aspherical Surface Data

| Surf. No. | K | A4 | A6 |
|---|---|---|---|
| 13 | 0.000 | 0.8295E−05 | 0.1541E−07 |

TABLE 16

LENS GROUP DATA

| Lens Group | 1st Surf. | Focal Length |
|---|---|---|
| 1 | 1 | 41.444 |
| Sub-1(2) | 14 | −91.995 |
| Sub-2(2) | 16 | 266.565 |

[Numerical Embodiment 5]

Figure 28:
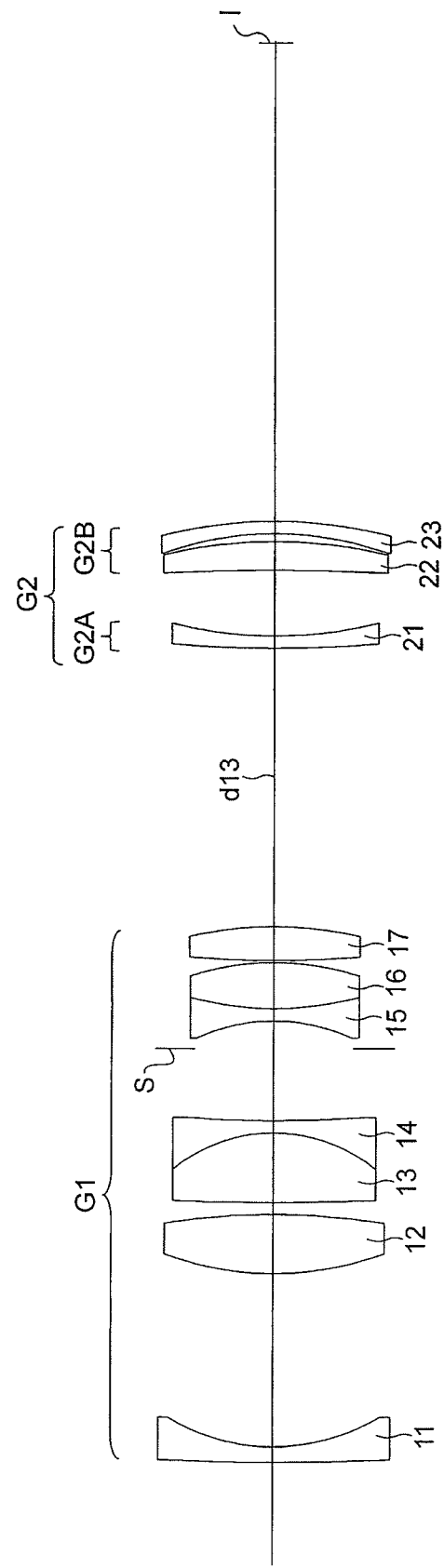
FIG. 28 shows a lens arrangement of the fifth numerical embodiment of the macro lens system, when focused on an object at a close distance.

FIGS. 25 through 30D and Tables 17 through 20 show a fifth numerical embodiment of a macro lens system according to the present invention. FIG. 25 shows a lens arrangement of the fifth numerical embodiment of the macro lens system when focused on an object at infinity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. FIG. 28 shows a lens arrangement of the fifth numerical embodiment of the zoom lens system when focused on an object at a close distance. FIGS. 29A, 29B, 29C and 29D show various aberrations that occurred in the lens arrangement shown in FIG. 28. FIGS. 30A, 30B, 30C and 30D show lateral aberrations that occurred in the lens arrangement shown in FIG. 28. Table 17 shows the lens surface data, Table 18 shows various data of the macro lens system, Table 19 shows aspherical surface data, and Table 20 shows various data of the lens groups of the fifth numerical embodiment of the macro lens system according to the present invention.

The fundamental lens arrangement of the fifth numerical embodiment is the same as that of the fourth numerical embodiment, except for the following aspects:

(1) The second lens group G2 has a positive refractive power.

(2) The negative lens element 11 of the first lens group G1 is a negative meniscus lens element having a convex surface on the object side.

TABLE 17

SURFACE DATA

| Surf. No. | r | d | N(d) | vd |
|---|---|---|---|---|
| 1 | 258.572 | 1.500 | 1.76932 | 48.7 |
| 2 | 20.334 | 16.806 | | |
| 3 | 32.190 | 5.670 | 1.83500 | 37.3 |
| 4 | −72.697 | 1.162 | | |
| 5 | 267.166 | 6.741 | 1.58031 | 54.8 |
| 6 | −16.057 | 1.200 | 1.58144 | 40.9 |
| 7 | 126.981 | 7.000 | | |
| 8(Diaphragm) | ∞ | 2.636 | | |
| 9 | −18.604 | 1.200 | 1.68893 | 31.2 |
| 10 | 33.506 | 4.471 | 1.49700 | 81.6 |
| 11 | −27.091 | 0.200 | | |
| 12 | 100.342 | 3.329 | 1.70000 | 56.5 |
| 13* | −34.961 | d13 | | |
| 14 | 119.502 | 1.200 | 1.49745 | 69.1 |
| 15 | 42.359 | 6.393 | | |
| 16 | −224.093 | 2.787 | 1.83400 | 37.3 |
| 17 | −47.744 | 0.759 | | |
| 18 | −33.324 | 1.200 | 1.77250 | 49.6 |
| 19 | −45.404 | — | | |

The asterisk (*) designates an aspherical surface which is rotationally symmetrical with respect to the optical axis.

TABLE 18

MACRO LENS SYSTEM DATA

|  | Infinite Focal Position | Close-Distance (−1.00:1) Focal Position |
|---|---|---|
| FNO. | 2.9 | 4.9 |
| f | 36.12 | 36.87 |
| W | 22.1 | 13.8 |
| Y | 14.24 | 14.24 |
| fB | 36.00 | 46.32 |
| L | 103.25 | 137.64 |
| d13 | 3.000 | 27.072 |

TABLE 19

Aspherical Surface Data

| Surf. No. | K | A4 | A6 |
|---|---|---|---|
| 13 | 0.000 | 0.6927E−05 | 0.5551E−08 |

TABLE 20

LENS GROUP DATA

| Lens Group | 1st Surf. | Focal Length |
|---|---|---|
| 1 | 1 | 34.748 |
| Sub-1(2) | 14 | −132.595 |
| Sub-2(2) | 16 | 127.979 |

[Numerical Embodiment 6]

Figure 31:
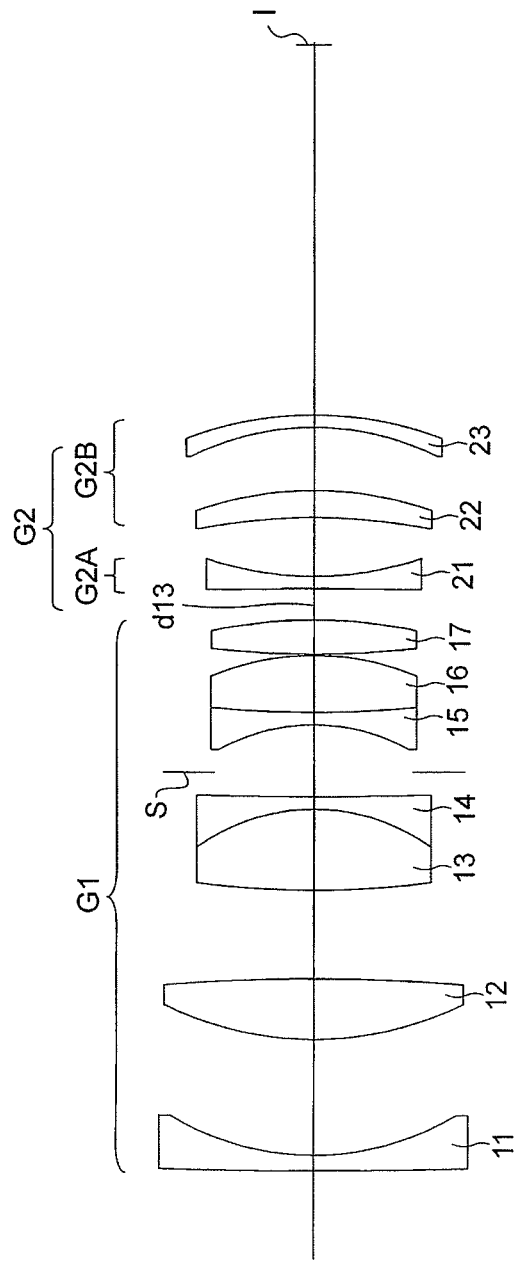
FIG. 31 shows a lens arrangement of a sixth numerical embodiment of a macro lens system, when focused on an object at infinity.
Figure 34:
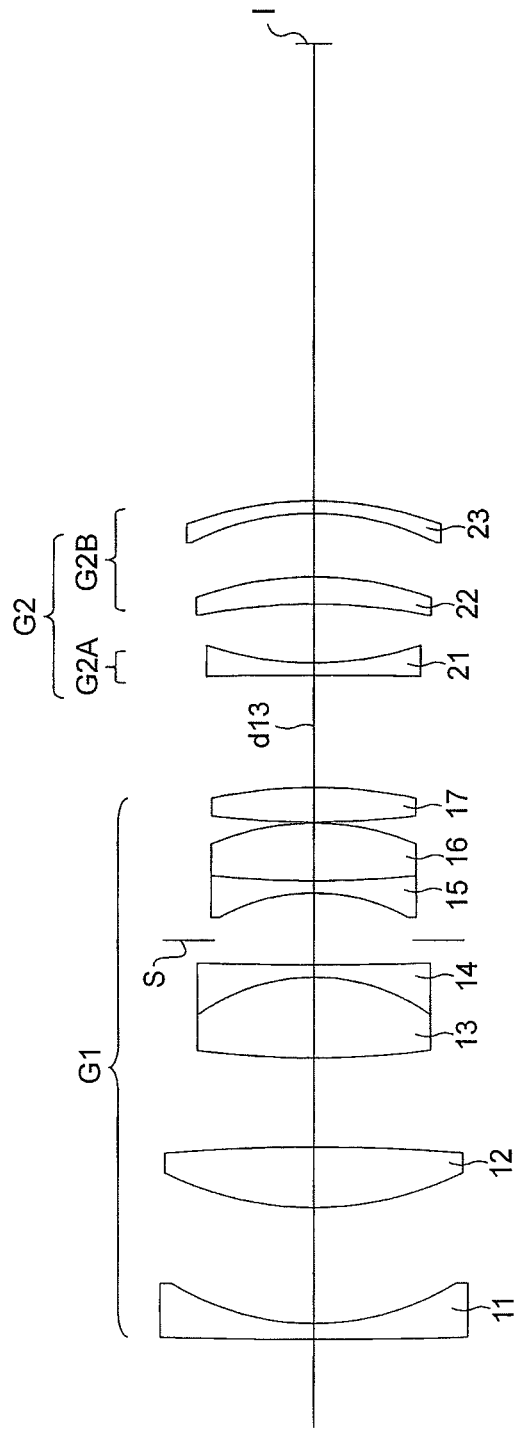
FIG. 34 shows a lens arrangement of the sixth numerical embodiment of the macro lens system, when focused on an object at a close distance.

FIGS. 31 through 36D and Tables 21 through 24 show a sixth numerical embodiment of a macro lens system according to the present invention. FIG. 31 shows a lens arrangement of the sixth numerical embodiment of the macro lens system when focused on an object at infinity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows a lens arrangement of the sixth numerical embodiment of the zoom lens system when focused on an object at a close distance. FIGS.

35A, 35B, 35C and 35D show various aberrations that occurred in the lens arrangement shown in FIG. 34. FIGS. 36A, 36B, 36C and 36D show lateral aberrations that occurred in the lens arrangement shown in FIG. 34. Table 21 shows the lens surface data, Table 22 shows various data of the macro lens system, Table 23 shows aspherical surface data, and Table 24 shows various data of the lens groups of the sixth numerical embodiment of the macro lens system according to the present invention.

The fundamental lens arrangement of the sixth numerical embodiment is the same as that of the fifth numerical embodiment, except for the following aspects:

(1) The second lens group G2 has a negative refractive power.

(2) The negative single lens element 21 of the first sub-lens group G2A is a biconcave negative single lens element.

TABLE 21

SURFACE DATA

| Surf. No. | r | d | N(d) | vd |
|---|---|---|---|---|
| 1 | 863.309 | 2.500 | 1.77250 | 49.6 |
| 2 | 46.450 | 18.570 | | |
| 3 | 56.361 | 9.790 | 1.83481 | 42.7 |
| 4 | −308.430 | 14.330 | | |
| 5 | 149.477 | 13.070 | 1.59282 | 68.6 |
| 6 | −33.606 | 2.000 | 1.58144 | 40.9 |
| 7 | 633.069 | 4.000 | | |
| 8(Diaphragm) | ∞ | 7.640 | | |
| 9 | −32.938 | 2.000 | 1.68893 | 31.2 |
| 10 | 181.952 | 9.230 | 1.49700 | 81.6 |
| 11 | −44.594 | 0.200 | | |
| 12 | 154.466 | 5.550 | 1.80610 | 40.7 |
| 13* | −79.480 | d13 | | |
| 14 | −1374.147 | 2.000 | 1.48749 | 70.4 |
| 15 | 56.337 | 9.480 | | |
| 16 | −101.426 | 4.390 | 1.83400 | 37.3 |
| 17 | −58.472 | 10.250 | | |
| 18 | −45.671 | 2.000 | 1.77250 | 49.6 |
| 19 | −60.467 | — | | |

The asterisk (*) designates an aspherical surface which is rotationally symmetrical with respect to the optical axis.

TABLE 22

MACRO LENS SYSTEM DATA

| | Infinite Focal Position | Close-Distance (−0.50:1) Focal Position |
|---|---|---|
| FNO. | 2.9 | 3.9 |
| f | 92.28 | 81.86 |
| W | 20.4 | 15.9 |
| Y | 34.85 | 34.85 |
| fB | 60.00 | 73.09 |
| L | 182.00 | 208.17 |
| d13 | 4.999 | 18.085 |

TABLE 23

Aspherical Surface Data

| Surf. No. | K | A4 | A6 |
|---|---|---|---|
| 13 | 0.000 | 0.1135E−05 | 0.1385E−09 |

TABLE 24

LENS GROUP DATA

| Lens Group | 1st Surf. | Focal Length |
|---|---|---|
| 1 | 1 | 59.585 |
| Sub-1(2) | 14 | −110.964 |
| Sub-2(2) | 16 | 398.303 |

[Numerical Embodiment 7]

Figure 40:
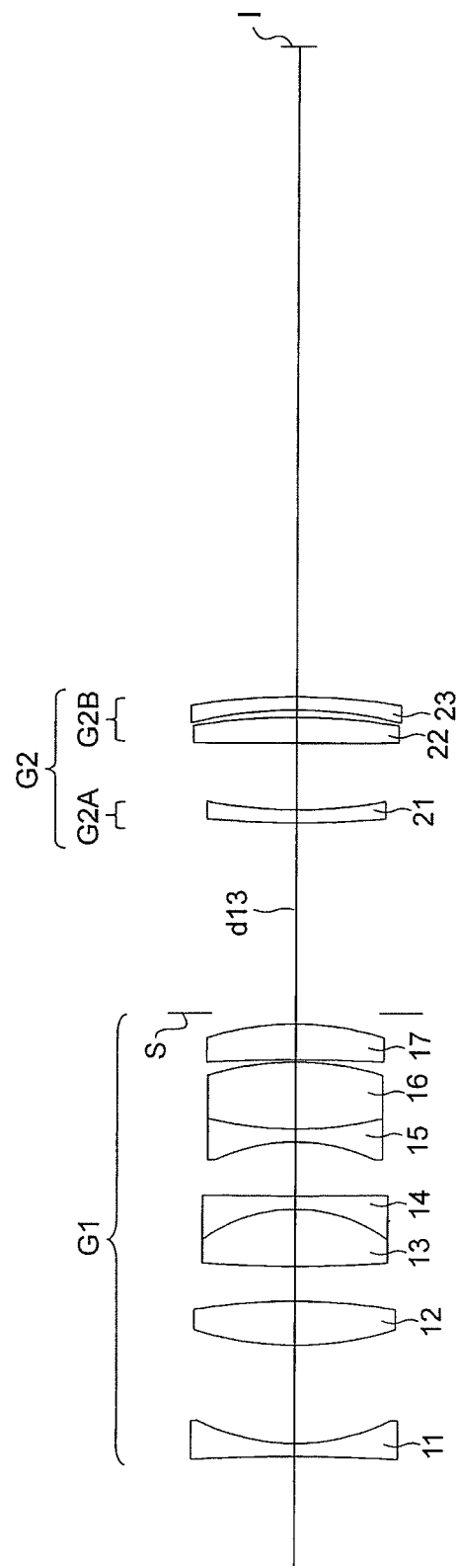
FIG. 40 shows a lens arrangement of the seventh numerical embodiment of the macro lens system, when focused on an object at a close distance.

FIGS. 37 through 42D and Tables 25 through 28 show a seventh numerical embodiment of a macro lens system according to the present invention. FIG. 37 shows a lens arrangement of the seventh numerical embodiment of the macro lens system when focused on an object at infinity. FIGS. 38A, 38B, 38C and 38D show various aberrations that occurred in the lens arrangement shown in FIG. 37. FIGS. 39A, 39B, 39C and 39D show lateral aberrations that occurred in the lens arrangement shown in FIG. 37. FIG. 40 shows a lens arrangement of the seventh numerical embodiment of the zoom lens system when focused on an object at a close distance. FIGS. 41A, 41B, 41C and 41D show various aberrations that occurred in the lens arrangement shown in FIG. 40. FIGS. 42A, 42B, 42C and 42D show lateral aberrations that occurred in the lens arrangement shown in FIG. 40. Table 25 shows the lens surface data, Table 26 shows various data of the macro lens system, Table 27 shows aspherical surface data, and Table 28 shows various data of the lens groups of the seventh numerical embodiment of the macro lens system according to the present invention.

The fundamental lens arrangement of the seventh numerical embodiment is the same as that of the first numerical embodiment, except for the following aspects:

(1) The negative lens element 11 of the first lens group G1 is a biconcave negative lens element.

(2) The positive lens element 13 of the first lens group G1 is a biconvex positive lens element, the negative lens element 14 of the first lens group G1 is a biconcave negative lens element, and the biconvex positive lens element 13 and the biconcave negative lens element 14 are bonded to each other.

TABLE 25

SURFACE DATA

| Surf. No. | r | d | N(d) | vd |
|---|---|---|---|---|
| 1 | −176.109 | 1.200 | 1.80450 | 39.6 |
| 2 | 20.265 | 8.900 | | |
| 3 | 31.798 | 3.990 | 1.90366 | 31.3 |
| 4 | −59.353 | 3.200 | | |
| 5 | 135.253 | 5.200 | 1.59282 | 68.6 |
| 6 | −14.920 | 1.200 | 1.56732 | 42.8 |
| 7 | 685.069 | 4.900 | | |
| 8 | −18.113 | 1.200 | 1.68893 | 31.2 |
| 9 | 35.948 | 6.130 | 1.49700 | 81.6 |
| 10 | −27.799 | 0.200 | | |
| 11 | −181.208 | 3.300 | 1.72903 | 54.0 |
| 12* | −27.013 | 1.000 | | |
| 13(Diaphragm) | ∞ | d13 | | |
| 14 | 89.593 | 1.200 | 1.58913 | 61.2 |
| 15 | 45.865 | 6.100 | | |
| 16 | 760.641 | 2.400 | 1.83400 | 37.3 |
| 17 | −58.786 | 0.680 | | |
| 18 | −40.508 | 1.200 | 1.80518 | 25.5 |
| 19 | −61.913 | — | | |

The asterisk (*) designates an aspherical surface which is rotationally symmetrical with respect to the optical axis.

TABLE 26

MACRO LENS SYSTEM DATA

|  | Infinite Focal Position | Close-Distance (−1.00:1) Focal Position |
|---|---|---|
| FNO. | 2.9 | 5.1 |
| f | 36.00 | 37.46 |
| W | 22.2 | 13.6 |
| Y | 14.24 | 14.24 |
| fB | 36.00 | 59.15 |
| L | 90.00 | 128.58 |
| d13 | 2.000 | 17.432 |

TABLE 27

Aspherical Surface Data

| Surf. No. | K | A4 | A6 |
|---|---|---|---|
| 12 | 0.000 | 0.6685E−05 | 0.1953E−07 |

TABLE 28

LENS GROUP DATA

| Lens Group | 1$^{st}$ Surf. | Focal Length |
|---|---|---|
| 1 | 1 | 38.134 |
| Sub-1(2) | 14 | −161.148 |
| Sub-2(2) | 16 | 117.507 |

[Numerical Embodiment 8]

Figure 43:
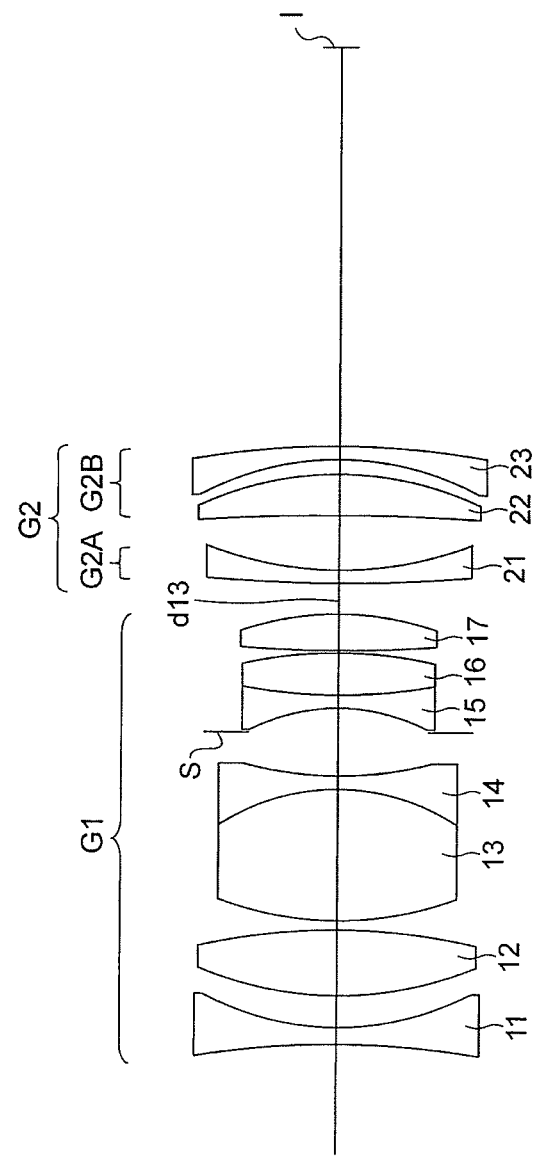
FIG. 43 shows a lens arrangement of an eighth numerical embodiment of a macro lens system, when focused on an object at infinity.
Figures 44A, 44B, 44C, 44D, 44E:
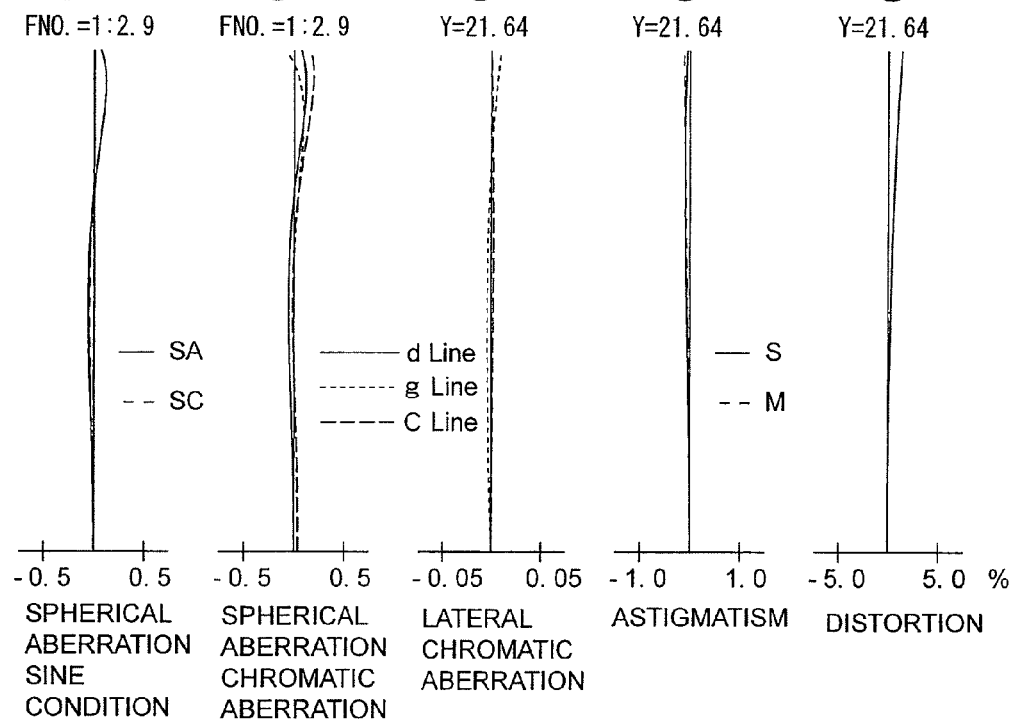
FIGS. 44A, 44B, 44C, 44D and 44E show various aberrations that occurred in the lens arrangement shown in FIG. 43.
Figure 45A:
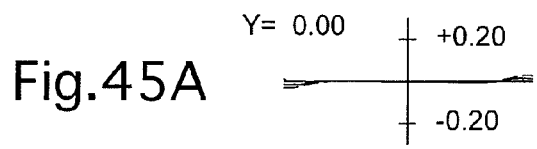
FIGS. 45A, 45B, 45C and 45D show various lateral aberrations that occurred in the lens arrangement shown in FIG. 43.
Figure 45B:
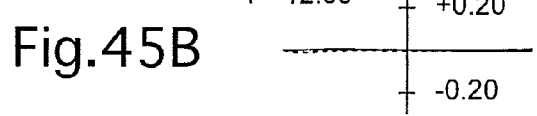
Figure 45C:
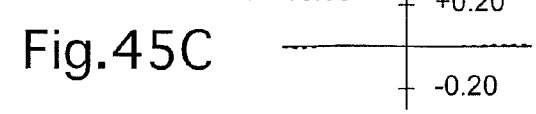
Figure 45D:
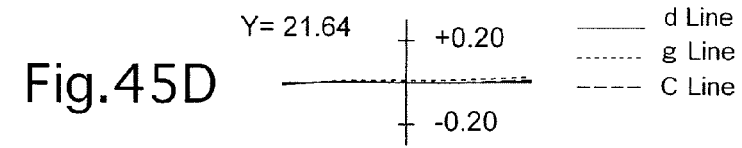
Figure 46:
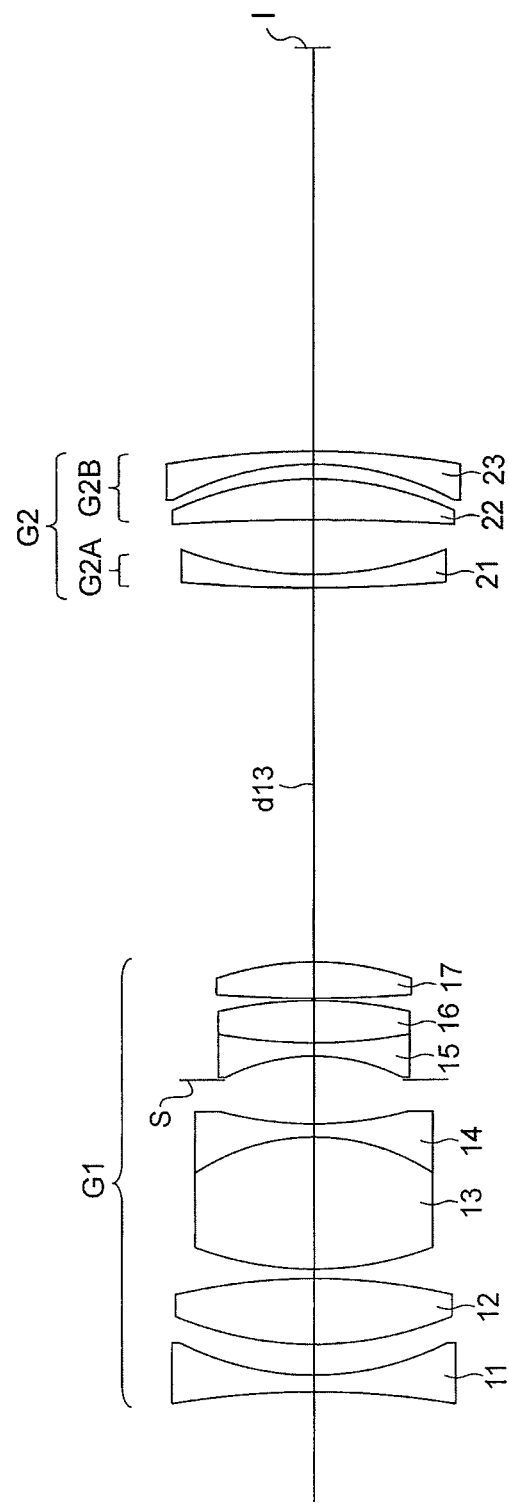
FIG. 46 shows a lens arrangement of the eighth numerical embodiment of the macro lens system, when focused on an object at a close distance.

FIGS. 43 through 48D and Tables 29 through 32 show an eighth numerical embodiment of a macro lens system according to the present invention. FIG. 43 shows a lens arrangement of the eighth numerical embodiment of the macro lens system when focused on an object at infinity. FIGS. 44A, 44B, 44C, 44D and 44E show various aberrations that occurred in the lens arrangement shown in FIG. 43. FIGS. 45A, 45B, 45C and 45D show lateral aberrations that occurred in the lens arrangement shown in FIG. 43. FIG. 46 shows a lens arrangement of the eighth numerical embodiment of the zoom lens system when focused on an object at a close distance. FIGS. 47A, 47B, 47C, 47D and 47E show various aberrations that occurred in the lens arrangement shown in FIG. 46. FIGS. 48A, 48B, 48C and 48D show lateral aberrations that occurred in the lens arrangement shown in FIG. 46. Table 29 shows the lens surface data, Table 30 shows various data of the macro lens system, Table 31 shows aspherical surface data, and Table 32 shows various data of the lens groups of the seventh numerical embodiment of the macro lens system according to the present invention.

The fundamental lens arrangement of the eighth numerical embodiment is the same as that of the fourth numerical embodiment.

TABLE 29

SURFACE DATA

| Surf. No. | r | d | N(d) | vd |
|---|---|---|---|---|
| 1 | −81.299 | 1.50 | 1.77250 | 49.6 |
| 2 | 27.396 | 2.86 | | |
| 3 | 34.199 | 5.93 | 1.81600 | 46.6 |
| 4 | −58.425 | 0.85 | | |
| 5 | 32.187 | 11.94 | 1.59282 | 68.6 |
| 6 | −20.590 | 1.20 | 1.51823 | 59.0 |
| 7 | 34.747 | 4.00 | | |
| 8(Diaphragm) | ∞ | 2.17 | | |
| 9 | −18.484 | 1.20 | 1.67270 | 32.2 |
| 10 | 50.940 | 3.85 | 1.49700 | 81.6 |
| 11 | −40.406 | 0.20 | | |
| 12 | 125.989 | 3.33 | 1.77250 | 49.6 |
| 13* | −27.185 | d13 | | |
| 14 | 149.524 | 1.20 | 1.48749 | 70.4 |
| 15 | 34.408 | 4.98 | | |
| 16 | −207.621 | 3.73 | 1.80518 | 25.5 |
| 17 | −31.184 | 1.34 | | |
| 18 | −27.722 | 1.20 | 1.80518 | 25.5 |
| 19 | −78.969 | — | | |

The asterisk (*) designates an aspherical surface which is rotationally symmetrical with respect to the optical axis.

TABLE 30

MACRO LENS SYSTEM DATA

|  | Infinite Focal Position | Close-Distance (−1.00:1) Focal Position |
|---|---|---|
| FNO. | 2.9 | 5.1 |
| f | 55.00 | 42.70 |
| W | 21.2 | 12.6 |
| Y | 21.64 | 21.64 |
| fB | 36.00 | 36.00 |
| L | 90.28 | 121.51 |
| d13 | 2.80 | 34.03 |

TABLE 31

Aspherical Surface Data

| Surf. No. | K | A4 | A6 |
|---|---|---|---|
| 13 | 0.000 | 0.8295E−05 | 0.1541E−07 |

TABLE 32

LENS GROUP DATA

| Lens Group | 1$^{st}$ Surf. | Focal Length |
|---|---|---|
| 1 | 1 | 41.444 |
| Sub-1(2) | 14 | −91.995 |
| Sub-2(2) | 16 | 266.565 |

The numerical values of each condition for each embodiment are shown in Table 33.

TABLE 33

|  | Embod. 1 | Embod. 2 | Embod. 3 | Embod. 4 |
|---|---|---|---|---|
| Cond. (1) | −0.878 | −0.934 | −1.363 | −1.673 |
| Cond. (2) | 63.85 | 71.68 | 68.62 | 70.44 |
| Cond. (3) | 0.716 | 0.653 | 0.769 | 0.728 |
| Cond. (4) | 0.222 | 0.164 | 0.239 | 0.230 |
| Cond. (5) | 0.80 | 0.75 | 0.55 | 0.25 |

|  | Embod. 5 | Embod. 6 | Embod. 7 | Embod. 8 |
|---|---|---|---|---|
| Cond. (1) | −3.671 | −1.202 | −4.476 | −1.673 |
| Cond. (2) | 69.09 | 70.44 | 61.25 | 70.44 |
| Cond. (3) | 0.899 | 0.654 | 0.989 | 0.728 |
| Cond. (4) | 0.354 | 0.041 | 0.512 | 0.23 |

TABLE 33-continued

| Cond. (5) | 0.30 | 0.50 | 0.60 | 0.00 |
|---|---|---|---|---|

As can be understood from Table 33, the first through eighth embodiments satisfy conditions (1) through (5). Furthermore, as can be understood from the aberration diagrams, the various aberrations are suitably corrected.

In the above-described embodiments, descriptions have been given illustrating an example in which the first sub-lens group G2A of the second lens group G2 serves as an image-stabilizing lens group (image-shake correction lens group) which corrects image shake by moving in directions orthogonal to the optical axis direction to displace the imaging position. However, the macro lens system of the present invention is also applicable to a zoom lens system which is not provided with an image-stabilizing function (image-shake correction function).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A macro lens system comprising a positive first lens group, and a positive or negative second lens group, in that order from the object side, wherein at least said first lens group moves toward the object side when changing from focusing on an object at infinity to focusing on an object at a close distance, and each lens group being defined such that a distance between adjacent lens elements of adjacent lens groups changes as focusing is performed
   wherein said second lens group includes a negative first sub-lens group and a positive second sub-lens group, in that order from the object side, wherein the following condition is satisfied:

$-5.0 < f2A/fi < -0.8$, wherein f2A designates the focal length of said first sub-lens group, and
   fi designates the focal length of the entire said macro lens system when focusing on an object at infinity.

2. The macro lens system according to claim 1, wherein said first sub-lens group comprises an image-stabilizing lens group which corrects image shake by moving in directions orthogonal to the optical axis direction to displace the imaging position of said macro lens system.

3. The macro lens system according to claim 1, wherein said first sub-lens group comprises a negative single lens element.

4. The macro lens system according to claim 3, wherein the following condition is satisfied:

$60 < v2A$, wherein v2A designates the Abbe number at the d-line of said negative single lens element of said first sub-lens group.

5. The macro lens system according to claim 1, wherein the following condition is satisfied:

$0.5 < R2/L2a < 1.2$, wherein

R2 designates the radius of curvature of the surface on the image side of the lens element provided closest to the image side within said first sub-lens group, and
   L2a designates the distance from the imaging plane to the surface on the image side of the lens element provided closest to an image side within said first sub-lens group, when focusing on an object at infinity.

6. The macro lens system according to claim 1, wherein the following condition is satisfied:

$|R2/R1| < 0.7$, wherein

R2 designates the radius of curvature of the surface on the image side of the lens element provided closest to the image side within said first sub-lens group, and
   R1 designates the radius of curvature of the surface on the object side of the lens element provided closest to the object side within said first sub-lens group.

7. The macro lens system according to claim 1, wherein said second sub-lens group comprises a positive lens element having a convex surface on the image side, and a negative lens element having concave surface on the object side, in that order from the object side.

8. The macro lens system according to claim 1, wherein upon changing from focusing on an object at infinity to focusing on an object at a close distance, said first lens group and said second lens group move toward the object side by different movement amounts.

9. The macro lens system according to claim 1, wherein upon changing from focusing on an object at infinity to focusing on an object at a close distance, said first lens group moves toward the object side and said second lens group remains stationary relative to the imaging plane.

10. The macro lens system according to claim 8, wherein the following condition is satisfied:

$0 < X2/X1 < 0.9$, wherein

X1 designates the movement amount of said first lens group during changing from focusing on an object at infinity to focusing on an object at a close distance, wherein a positive value of X1 designates movement toward the object side, and
    X2 designates the movement amount of said second lens group during changing from focusing on an object at infinity to focusing on an object at a close distance, wherein a positive value of X2 designates movement toward the object side.

11. A macro lens system comprising a positive first lens group, and a positive or negative second lens group, in that order from the object side, wherein at least said first lens group moves toward the object side when changing from focusing on an object at infinity to focusing on an object at a close distance
    wherein said second lens group includes a negative first sub-lens group and a positive second sub-lens group, in that order from the object side,
    wherein said first sub-lens group comprises a negative single lens element, and wherein the following condition is satisfied:

$-5.0 < f2A/fi < -0.8$, wherein f2A designates the focal length of said first sub-lens group, and
    fi designates the focal length of the entire said macro lens system when focusing on an object at infinity.

12. The macro lens system according to claim 11, wherein said first sub-lens group comprises an image-stabilizing lens group which corrects image shake by moving in directions orthogonal to the optical axis direction to displace the imaging position of said macro lens system.

13. The macro lens system according to claim 11, wherein the following condition is satisfied:

$60 < v2A$, wherein v2A designates the Abbe number at the d-line of said negative single lens element of said first sub-lens group.

14. The macro lens system according to claim 11, wherein upon changing from focusing on an object at infinity to focusing on an object at a close distance, said first lens group and said second lens group move toward the object side by different movement amounts.

15. The macro lens system according to claim 11, wherein upon changing from focusing on an object at infinity to focusing on an object at a close distance, said first lens group moves toward the object side and said second lens group remains stationary relative to the imaging plane.

16. A macro lens system comprising a positive first lens group, and a positive or negative second lens group, in that order from the object side, wherein at least said first lens group moves toward the object side when changing from focusing on an object at infinity to focusing on an object at a close distance, and
   wherein said second lens group includes a negative first sub-lens group and a positive second sub-lens group, in that order from the object side,
   wherein said second sub-lens group comprises a positive lens element having a convex surface on the image side, and a negative lens element having concave surface on the object side, in that order from the object side, and
   wherein the following condition is satisfied:

$-5.0 < f2A/fi < -0.8$, wherein f2A designates the focal length of said first sub-lens group, and fi designates the focal length of the entire said macro lens system when focusing on an object at infinity.

17. The macro lens system according to claim 16, wherein said first sub-lens group comprises an image-stabilizing lens group which corrects image shake by moving in directions orthogonal to the optical axis direction to displace the imaging position of said macro lens system.

18. The macro lens system according to claim 16, wherein the following condition is satisfied:

$60 < v2A$, wherein v2A designates the Abbe number at the d-line of a negative single lens element of said first sub-lens group.

19. The macro lens system according to claim 16, wherein upon changing from focusing on an object at infinity to focusing on an object at a close distance, said first lens group and said second lens group move toward the object side by different movement amounts.

20. The macro lens system according to claim 16, wherein upon changing from focusing on an object at infinity to focusing on an object at a close distance, said first lens group moves toward the object side and said second lens group remains stationary relative to the imaging plane.

* * * * *